(12) United States Patent
Kim et al.

(10) Patent No.: US 9,113,166 B2
(45) Date of Patent: Aug. 18, 2015

(54) APPARATUS AND METHOD FOR IMAGE ENCODING/DECODING CONSIDERING IMPULSE SIGNAL

(75) Inventors: Hayoon Kim, Gyeonggi-do (KR); Joohee Moon, Seoul (KR); Yunglyul Lee, Seoul (KR); Haekwang Kim, Seoul (KR); Byeungwoo Jeon, Gyeonggi-do (KR); Kibaek Kim, Seoul (KR); Hyoungmee Park, Gyeonggi-do (KR)

(73) Assignee: SK TELECOM CO., LTD., Seoul (KR)

( * ) Notice: Subject to any disclaimer, the term of this patent is extended or adjusted under 35 U.S.C. 154(b) by 517 days.

(21) Appl. No.: 13/002,276

(22) PCT Filed: Sep. 21, 2009

(86) PCT No.: PCT/KR2009/005362
§ 371 (c)(1),
(2), (4) Date: Mar. 29, 2011

(87) PCT Pub. No.: WO2010/035993
PCT Pub. Date: Apr. 1, 2010

(65) Prior Publication Data
US 2012/0106633 A1    May 3, 2012

(30) Foreign Application Priority Data

Sep. 25, 2008  (KR) .................. 10-2008-0094167
Sep. 10, 2009  (KR) .................. 10-2009-0085571

(51) Int. Cl.
*H04N 7/32*    (2006.01)
*H04N 19/14*   (2014.01)
(Continued)

(52) U.S. Cl.
CPC .............. *H04N 19/14* (2014.11); *H04N 7/32* (2013.01); *H04N 19/122* (2014.11); *H04N 19/176* (2014.11); *H04N 19/46* (2014.11); *H04N 19/61* (2014.11)

(58) Field of Classification Search
CPC ........................................................ H04N 7/32
USPC .................................................... 375/240.12
See application file for complete search history.

(56) References Cited

U.S. PATENT DOCUMENTS

2003/0138150 A1*  7/2003  Srinivasan .................. 382/238
2003/0156648 A1*  8/2003  Holcomb et al. ......... 375/240.18
(Continued)

FOREIGN PATENT DOCUMENTS

KR    1020040099086    11/2004

OTHER PUBLICATIONS

International Search Report mailed Apr. 21, 2010 for PCT/KR2009/005362, citing the above references.

*Primary Examiner* — Richard Torrente
*Assistant Examiner* — Irfan Habib
(74) *Attorney, Agent, or Firm* — Lowe Hauptman & Ham, LLP

(57) ABSTRACT

An apparatus and method for video encoding/decoding considering impulse signal are disclosed. The method for video encoding includes generating a predicted block from predicting a current block and subtracting the predicted block from the current block to generate an M×N residual block, and encoding an A×B residual block containing residual signals of an impulsive component in the M×N residual block to generate a bitstream. The apparatus and the method of the present disclosure improve coding efficiency by efficiently encoding or decoding the residual signals of the impulse component in encoding or decoding videos.

14 Claims, 19 Drawing Sheets

(51) Int. Cl.
*H04N 19/50* (2014.01)
*H04N 19/176* (2014.01)
*H04N 19/46* (2014.01)
*H04N 19/122* (2014.01)
*H04N 19/61* (2014.01)

(56) References Cited

U.S. PATENT DOCUMENTS

| | | | |
|---|---|---|---|
| 2005/0135484 A1* | 6/2005 | Lee et al. | 375/240.16 |
| 2005/0276505 A1* | 12/2005 | Raveendran | 382/268 |
| 2005/0281473 A1* | 12/2005 | Kim et al. | 382/236 |
| 2006/0008006 A1* | 1/2006 | Cha et al. | 375/240.16 |
| 2006/0133677 A1* | 6/2006 | Park et al. | 382/236 |
| 2006/0165171 A1* | 7/2006 | Cha et al. | 375/240.12 |
| 2006/0215919 A1* | 9/2006 | Srinivasan | 382/236 |
| 2007/0014348 A1* | 1/2007 | Bao et al. | 375/240.1 |
| 2007/0065026 A1* | 3/2007 | Lee et al. | 382/236 |
| 2008/0049834 A1* | 2/2008 | Holcomb et al. | 375/240.2 |
| 2008/0137726 A1* | 6/2008 | Chatterjee et al. | 375/240.01 |
| 2009/0268821 A1* | 10/2009 | Au et al. | 375/240.16 |
| 2009/0279606 A1* | 11/2009 | Lee et al. | 375/240.12 |
| 2010/0020877 A1* | 1/2010 | Au et al. | 375/240.16 |
| 2011/0142134 A1* | 6/2011 | Wahadaniah et al. | 375/240.16 |
| 2011/0150087 A1* | 6/2011 | Kim et al. | 375/240.12 |
| 2011/0158315 A1* | 6/2011 | Kim et al. | 375/240.03 |
| 2011/0200113 A1* | 8/2011 | Kim et al. | 375/240.16 |
| 2012/0328015 A1* | 12/2012 | Kim et al. | 375/240.13 |
| 2013/0301704 A1* | 11/2013 | Srinivasan et al. | 375/240.02 |

* cited by examiner (a)

(b)

A: NUMBERS OF COLUMNS, B: NUMBER OF ROWS

1×4 BLOCK TYPE
(a)

4×3 BLOCK TYPE
(b)

2×2 BLOCK TYPE
(c)

3×4 BLOCK TYPE
(d)

RESIDUAL SIGNAL

| X1 | X2 | X3 | X4 |
| X5 | X6 | X7 | X8 |
| X9 | X10 | X11 | X12 |
| X13 | X14 | X15 | X16 |

3×3 BLOCK TYPE

| 0 | 0 | 0 | 0 |
| X5 | X6 | X7 | 0 |
| X9 | X10 | X11 | 0 |
| X13 | X14 | X15 | 0 |

(a)　　　　　　　　　　(b)

$$Y = A X B$$

$$\begin{bmatrix} A & B & C \\ D & E & F \\ G & H & I \end{bmatrix} = \begin{bmatrix} a1 & a2 & a3 \\ b1 & b2 & b3 \\ c1 & c2 & c3 \end{bmatrix} \begin{bmatrix} x1 & x2 \\ x3 & x4 \\ x5 & x6 \end{bmatrix} \begin{bmatrix} d1 & e1 \\ d2 & e2 \end{bmatrix}$$

Y　　　　　　　　A　　　　　　　X　　　　　B (a)

(b)

(c)

(d)

APPARATUS AND METHOD FOR IMAGE ENCODING/DECODING CONSIDERING IMPULSE SIGNAL

CROSS REFERENCE TO RELATED APPLICATION

This application claims the priority of Korean Patent Application No. 10-2008-0094167, filed on Sep. 25, 2008 and Korean Patent Application No. 10-2009-0085571, filed on Sep. 10, 2009 in the KIPO (Korean Intellectual Property Office), the disclosure of which are incorporated herein in their entirety by reference. Further, this application is the National Phase application of International Application No. PCT/KR2009/005362, filed Sep. 21, 2009, which designates the United States and was published in Korean. Each of these applications is hereby incorporated by reference in their entirety into the present application.

TECHNICAL FIELD

The present disclosure relates to an apparatus and method for image and video encoding/decoding considering an impulsive signal. More particularly, the present disclosure relates to an apparatus and method for encoding/decoding the image residual signals of impulsive component effectively to improve the encoding efficiency.

BACKGROUND ART

The statements in this section merely provide background information related to the present disclosure and may not constitute prior art.

Moving Picture Experts Group (MPEG) and Video Coding Experts Group (VCEG) have developed an improved and excellent video compression technology over existing MPEG-4 Part 2 and H.263 standards. The new standard is named H.264/AVC (Advanced Video Coding) and was released simultaneously as MPEG-4 Part 10 AVC and ITU-T Recommendation H.264.

The video compression in such H.264/AVC (hereinafter referred to as 'H.264') involves various techniques of discrete cosine transform (DCT) of integer type, variable block size motion estimation and compensation, quantization, and entropy coding.

Video data encoding methods according to H.264 may be classified generally by prediction types into an intra prediction encoding and an inter-prediction encoding. Intra prediction predicts the current block to be encoded in a reference picture by using pixels of neighboring blocks with the current block. Inter-prediction uses the current block's closest block pixels in unidirectional or bidirectional reference pictures in predicting the current block.

Instead of encoding and compressing the entire image data, most video image compression techniques like the H.264 simply process the difference of the original pixels to the pixels predicted through the inter-prediction, intra prediction or the like in a way to remove the temporal and spatial redundancy. The smaller the difference of the predicted pixels from the original pixels, the smaller the image data becomes to be compressed which is translated into higher compression efficiency.

Therefore, in the video image compression space to improve the compression efficiency, there have been various prediction and encoding methods suggested to increase the prediction accuracy such as by determining either the inter-prediction or intra prediction depending on the image characteristics, prediction accuracy enhancement techniques, etc.

However, there are numerous reasons that the pixels cannot always be predicted accurately. In such a case, the deviations of the inaccurate pixels from the original pixels are excessive compared to other pixels. A residual signal of impulsive component refers to a larger one of the residual signals, which are the differences between the original pixels and predicted pixels, and the impulsive components have adverse effects on the video compression efficiency.

DISCLOSURE

Technical Problem

Therefore, the present disclosure has been made for effective video encoding/decoding on the residual signals of the impulsive component in order to increase the compression efficiency.

Technical Solution

One aspect of the present disclosure provides a method for video encoding including: generating a predicted block from predicting a current block and subtracting the predicted block from the current block to generate an M×N residual block, and encoding an A×B residual block containing residual signals of an impulsive component in the M×N residual block to generate a bitstream.

Another aspect of the present disclosure provides an apparatus for video encoding including: a predictor for generating a predicted block from predicting a current block; a subtractor for generating an M×N residual block by subtracting the predicted block from the current block; and an A×B encoder for encoding an A×B residual block containing residual signals of an impulsive component in the M×N residual block to generate a bitstream.

Yet another aspect of the present disclosure provides a method for video decoding including: decoding a bitstream to extract quantized frequency coefficients in a sequence; generating an A×B residual block by performing an inverse scan, inverse quantization and inverse transform with respect to the quantized frequency coefficient sequence by the A×B block; generating an M×N residual block by adding one or more residual signals to the A×B residual block; generating a predicted block from predicting a current block; and reconstructing the current block by adding the predicted block to the M×N residual block.

Yet another aspect of the present disclosure provides an apparatus for video decoding including: a decoder for decoding a bitstream to extract quantized frequency coefficients in a sequence; an A×B residual block generator for generating an A×B residual block by performing an inverse scan, inverse quantization and inverse transform with respect to the quantized frequency coefficient sequence in A×B blocks; an M×N residual block generator for generating an M×N residual block by adding one or more residual signals to the A×B residual block; a predictor for generating a predicted block from predicting a current block; and an adder for reconstructing the current block by adding the predicted block to the M×N residual block.

Advantageous Effects

According to the disclosure as described above, the present disclosure provides effective video encoding/decoding on the residual signals of the impulsive component and improves the compression efficiency to enhance the video compression performance.

MODE FOR INVENTION

Figure 1:
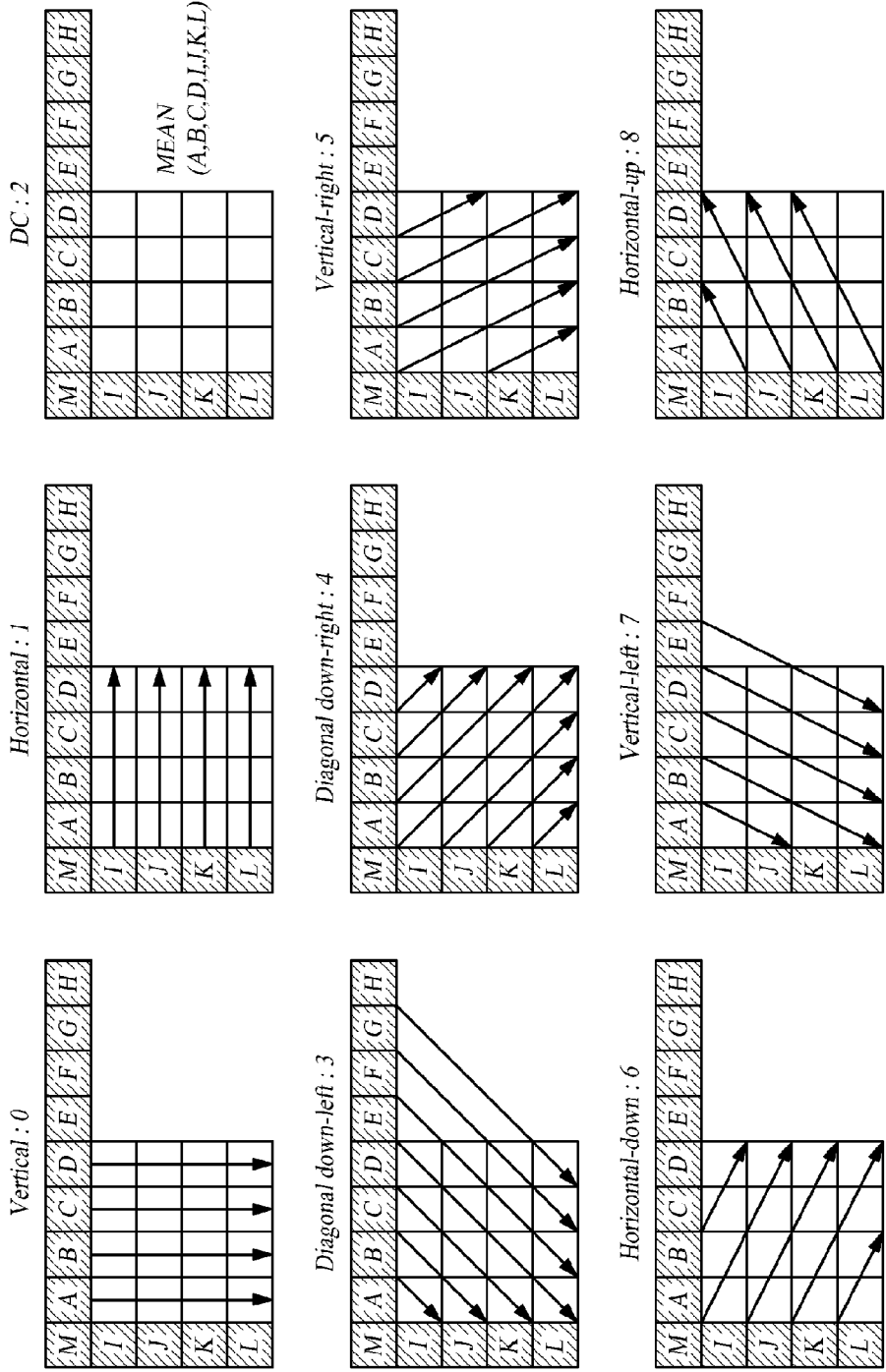
FIGS. 1 and 2 are exemplary diagrams for showing predictions in intra prediction and inter-prediction, respectively.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Also, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Figure 2:
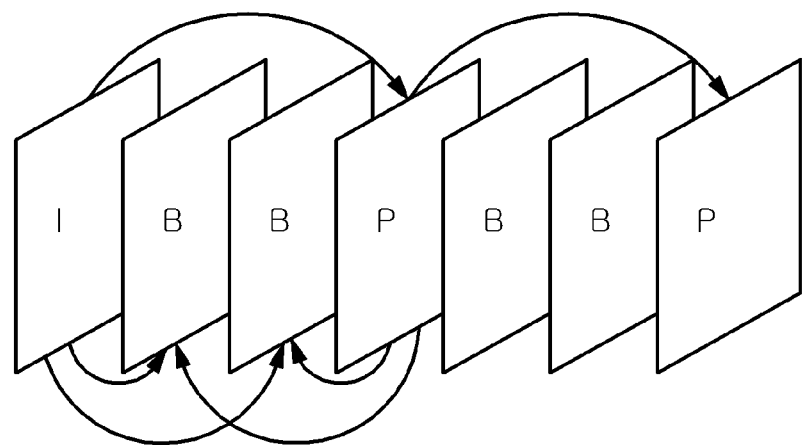

FIGS. 1 and 2 are exemplary diagrams for viewing predictions in intra prediction and inter-prediction, respectively.

Intra prediction has an intra_4×4 prediction, intra_16×16 prediction, and intra_8×8 prediction, and each of these predictions includes plural prediction modes.

In FIG. 1, there are nine prediction modes in the intra_4×4 prediction shown to include a vertical mode, horizontal mode, direct current (DC) mode, diagonal down-left mode, diagonal down-right mode, vertical-right mode, horizontal-down mode, vertical-left mode and horizontal-up mode.

Although not shown, the intra_8×8 prediction also has its modes similar to the intra_4×4 prediction, and the intra_16×16 prediction has four prediction modes including a vertical mode, horizontal mode, DC mode and plane mode.

Inter prediction is to predict pixels by using a motion estimation technique and a motion compensation technique. Referring to FIG. 2, a video consists of a series of still images. These still images are classified by the group of pictures or GOP. Each still image is called a picture or frame. A picture group may include I pictures, P pictures, and B pictures. The I picture needs not use a reference picture to be encoded while the P picture and B picture need the reference picture to carry out the motion estimation and motion compensation. Especially, the B picture is encoded through forward, backward, or bidirectional predictions by using future or past pictures as the reference picture.

The motion estimation and motion compensation to encode the P picture are carried out by using the previously encoded I picture or P picture as the reference picture. The motion estimation and motion compensation to encode the B picture may use the I, P, or B pictures as the reference picture.

Figure 3:
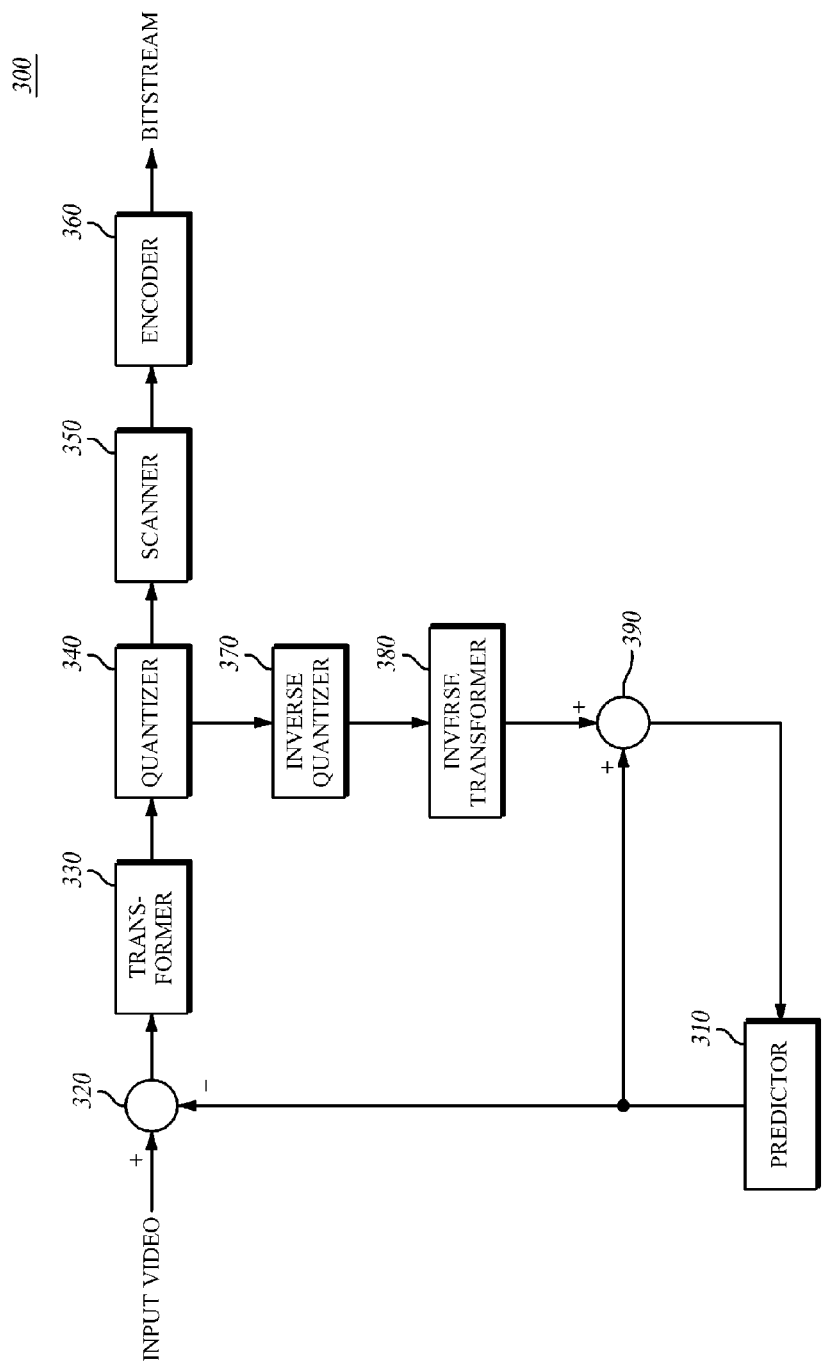
FIG. 3 is a schematic block diagram for showing an electronic configuration of a video encoding apparatus.

FIG. 3 is a schematic block diagram for showing an electronic configuration of a video encoding apparatus 300.

Video encoding apparatus 300 may comprise a predictor 310, a subtractor 320, a transformer 330, a quantizer 340, a scanner 350, an encoder 360, an inverse quantizer 370, an inverse transformer 380, and an adder 390.

Predictor 310 predicts the current video block that is to be encoded at the present time and generates a predicted block. In other words, predictor 310 predicts the pixel value of each of pixels in current block to encode out of a video according to a predetermined optimal prediction mode to generate a predicted block having a predicted pixel value. Predictor 310 also delivers prediction mode information to encoder 350 where it may be encoded.

Subtractor 320 generates a residual block by subtracting the predicted block from the current block. Specifically, subtractor 320 generates a residual block that is residual signals of a rectangular shape from the calculated difference between the pixel values of the respective pixels in the current block and the predicted pixel values of the respective pixels in the predicted block at predictor 310.

Transformer 330 transforms the residual block into one in the frequency domain to effect the transform of the respective pixel values of the residual block into frequency coefficients. Here, the transform of the residual signals into the frequency domain at transformer 330 may be through various techniques of transforming video signals on the space axis into the frequency axis such as Hadamard transform, discrete cosine transform (DCT) based transform and others where the residual signals transformed into the frequency domain become the frequency coefficients.

Quantizer 340 performs a quantization with respect to the residual block containing the frequency coefficients, which have been transformed into the frequency domain by transformer 330. Here, quantizer 340 may operate by using various quantizing techniques such as a dead zone uniform threshold quantization (DZUTQ), quantization weighted matrix, their improvements, or others.

Scanner 350 generates the quantized frequency coefficients in a sequence by performing various scanning methods such as zig-zag scanning or others with respect to the quantized frequency coefficients of the quantized residual blocks from quantizer 340.

Encoder 360 encodes the quantized frequency coefficient sequence from scanner 350 by using methods such as an entropy coding technique to generate a bitstream. At the same time, encoder 360 may encode information on the prediction mode in which the current block was predicted at predictor 310.

Inverse quantizer 370 performs inverse quantization with respect to the quantized residual block from quantizer 340. Specifically, inverse quantizer 370 performs inverse quantization with respect to the quantized frequency coefficients of the quantized residual block and generates the residual block having the frequency coefficient.

Inverse transformer 380 performs an inverse transform with respect to the inverse quantized residual block from inverse quantizer 370. Specifically, inverse transformer 380 performs the inverse transform with respect to the frequency coefficients of the inverse quantized residual block to generate a residual block having pixel values, that is, reconstructed residual block. Here, inverse transformer 380 may use the reverse of the transform process at transformer 330 in its operation.

Adder 390 adds the reconstructed residual block from inverse transformer 380 to the predicted block at predictor 310 to reconstruct the current block. The reconstructed current block may be used in predictor 310 as a reference block for encoding the next block to the current block or in a future encoding of another block.

Although not shown in FIG. 3, between predictor 310 and adder 390, a deblocking filter (not shown) may be additionally connected. The deblocking filter performs the deblocking filtering on the reconstructed current block received from adder 390. Here, the deblocking filtering refers to the operation for reducing blocking artifacts stemming from encoding the video by the block and it can be implemented through applying a deblocking filter at the block boundary and macroblock boundary, restricting the deblocking filter to apply only at the macroblock boundary, or forgoing the use thereof.

Figure 4:
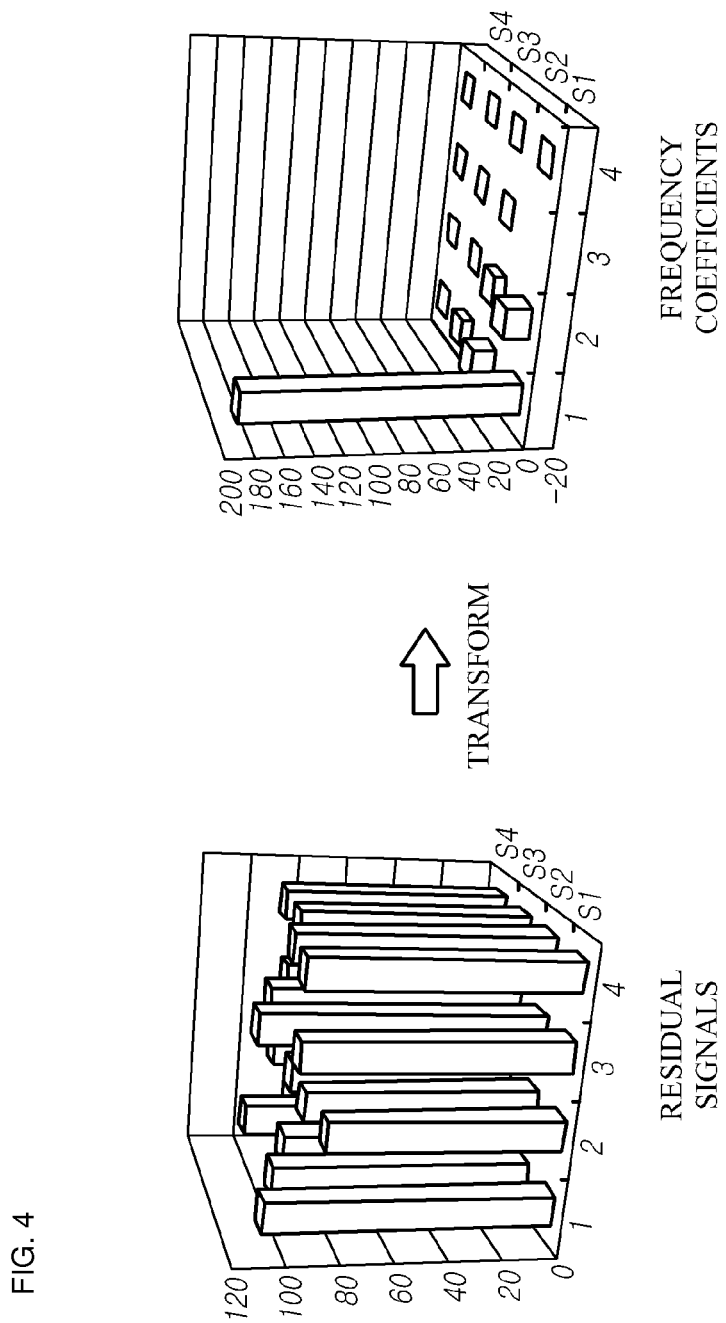
FIG. 4 is an exemplary diagram for showing residual signals before transform and frequency coefficients after transform.
Figure 5:
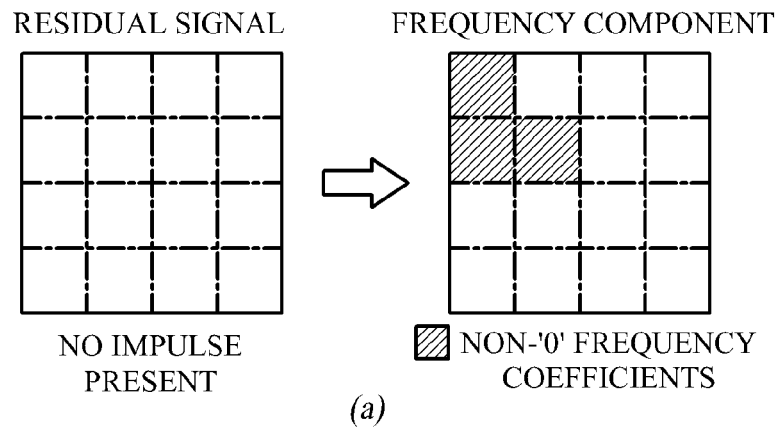
FIG. 5 is an exemplary diagram for showing an impulse influencing a frequency domain.
Figure 5:
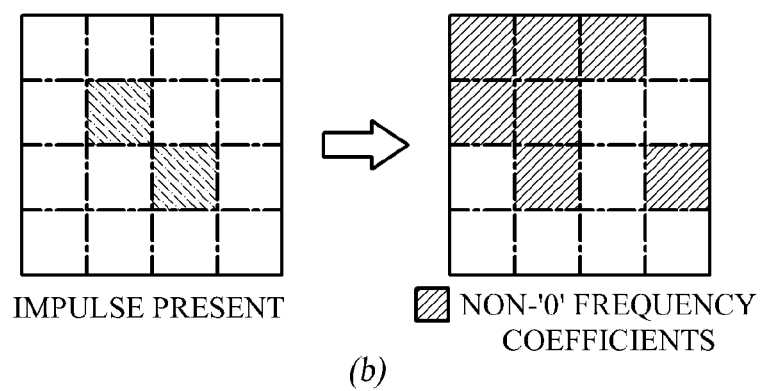

Meanwhile, when transformer 330 performs transform on the residual signals of the residual block into the frequency domain to generate the frequency coefficients, the residual signals are decomposed into low frequency components and high frequency components. In this way, when the decomposed frequency coefficients are quantized and zig-zag scanned at scanner 350, with no impulsive component occurring in the residual block, the frequency coefficients of the low frequency component are valued non-zero and converge around the frequency coefficients of the DC component as the frequency coefficients of the high frequency component becomes '0' and negligible, as shown in FIG. 5A. Therefore, encoding only the quantized frequency coefficients concentrating about the DC-component frequency coefficients may offer a high compression effect, as shown in FIG. 4. FIG. 4 visualizes the distribution of the frequency coefficients that are the transformation from the residual signal showing non-zero values are concentrating about the DC-component frequency coefficients.

However, if the accuracy of prediction becomes lowered causing the residual signals of the impulsive component to issue all over the residual block, transforming the residual signals of the impulsive component into the frequency domain gives frequency coefficients of high frequency component transformed and generated as shown in FIG. 5B. Such frequency coefficients of high frequency component are positioned at the end of the quantized frequency coefficient sequence once they are subjected to the quantization and zig-zag scanning, thereby non-zero values are generated in the last part of the quantized frequency coefficient sequence, increasing the data amount in the eventually bitstream. In other words, if there were no impulsive component residual signals issued, the data amount of the encoded bitstream would decrease, though the reality is that impulsive component residual signals do occur adding to the high values of the high frequency component frequency coefficients to increase the data amount of the encoded bitstream and hence deteriorate the video compression performance. Therefore, at the presence of the impulsive component residual signals in the residual block, there is a need to encode the video effectively notwithstanding.

The present disclosure provides the video encoding/decoding method and apparatus for an effective coding operation when the impulsive component residual signals are contained in the residual block. In the present disclosure, the impulsive component residual signals refer to the residual signals within the residual block, the absolute values of which are equal to or greater than a predetermined value.

Figure 6:
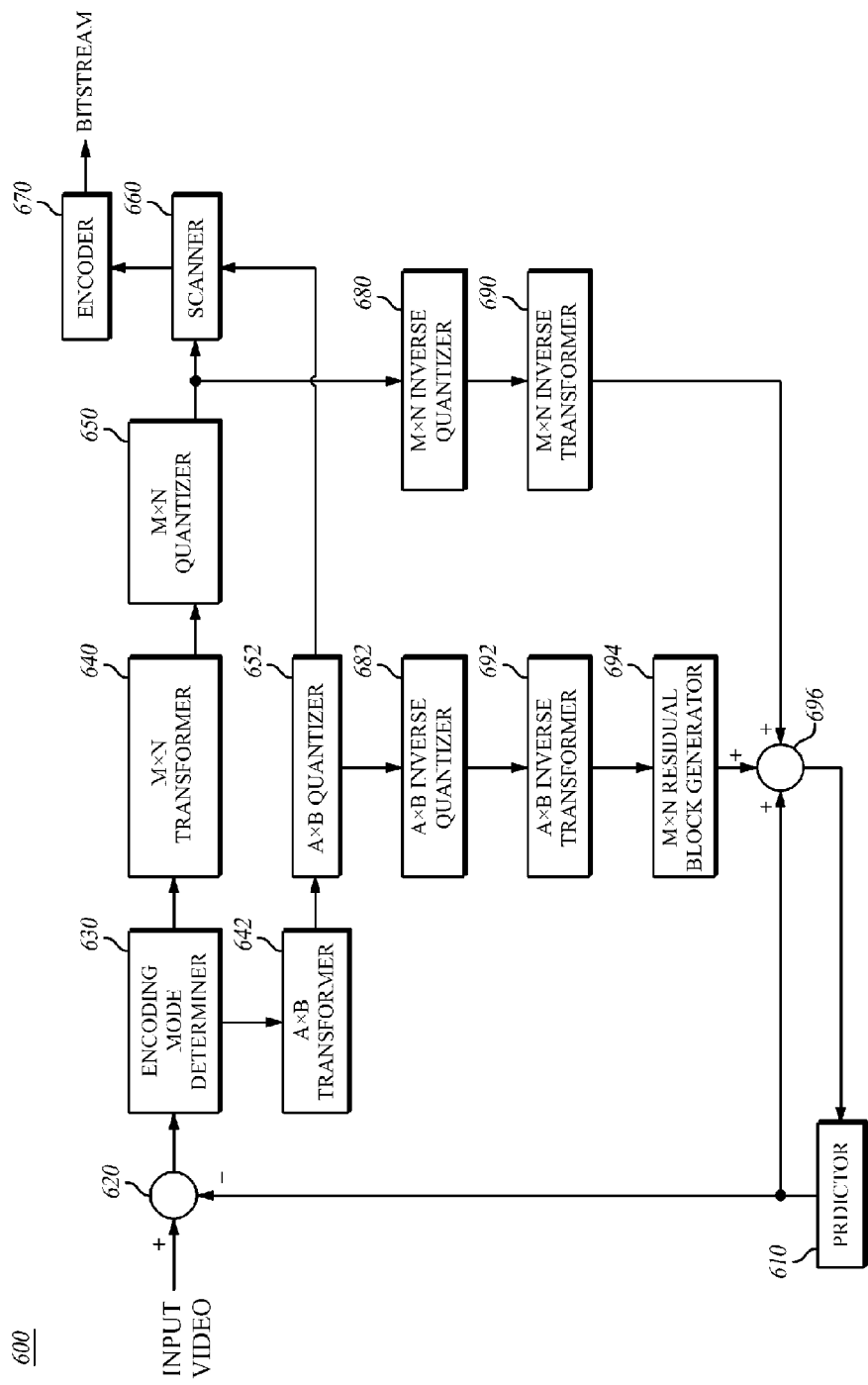
FIG. 6 is a block diagram of a video encoding apparatus according to a first aspect.

FIG. 6 is a block diagram of a video encoding apparatus 600 according to a first aspect.

Video encoding apparatus 600 may include a predictor 610, a subtractor 620, an encoding mode determiner 630, an M×N transformer 640, an A×B transformer 642, an M×N quantizer 650, an A×B quantizer 652, a scanner 660, an encoder 670, an M×N inverse quantizer 680, an A×B inverse quantizer 682, an M×N inverse transformer 690, an A×B inverse transformer 692, and an adder 696.

Video encoding apparatus 600 may be a personal computer or PC, notebook or laptop computer, personal digital assistant or PDA, portable multimedia player or PMP, PlayStation Portable or PSP, or mobile communication terminal, smart phone or such devices, and represent a variety of apparatuses equipped with, for example, a communication system such as a modem for carrying out communications between various devices or wired/wireless communication networks, a memory for storing various programs for encoding videos and related data, and a microprocessor for executing the programs to effect operations and controls.

Predictor 610 and subtractor 620 are respectively identical or similar to predictor 310 and subtractor 320 of video encoding apparatus 300 described with reference to FIG. 3, and their details are omitted to save a repetition. In addition, M×N transformer 640, M×N quantizer 650, M×N inverse quantizer 680, M×N inverse transformer 690, A×B transformer 642, A×B quantizer 652, A×B inverse quantizer 682, and A×B inverse transformer 692 are similar to the video encoding apparatus 300 in FIG. 3 at transformer 330, quantizer 340, inverse quantizer 370, and inverse transformer 380 in that they transform the residual block into frequency domain, quantize the transformed frequency coefficients, and perform inverse quantization and inverse transform with respect to the quantized frequency coefficients.

In comparison, M×N transformer 640, M×N quantizer 650, M×N inverse quantizer 680, and M×N inverse transformer 690 are respectively similar to transformer 330, quantizer 340, inverse quantizer 370, and inverse transformer 380 as these M×N components operate by the M×N block that is sized equal to the current block, while A×B transformer 642, A×B quantizer 652, A×B inverse quantizer 682, and A×B inverse transformer 692 are similar to the M×N counterparts but accordingly named to identify they operate by the A×B sized block. On the contrary, A×B transformer 642, A×B quantizer 652, A×B inverse quantizer 682, and A×B inverse transformer 692 are common to transformer 330, quantizer 340, inverse quantizer 370, and inverse transformer 380 in that they perform transform, quantization, inverse quantization, and inverse transform with respect to the residual block but differ in that they operate on the residual block by the A×B block.

In the following descriptions on A×B transformer 642, A×B quantizer 652, A×B inverse quantizer 682, and A×B inverse transformer 692, their differences will be emphasized against transformer 330, quantizer 340, inverse quantizer 370, and inverse transformer 380.

Depending on whether an M×N residual block delivered from subtractor 620 contains the impulsive component residual signal, encoding mode determiner 630 chooses between the M×N residual block and an A×B residual block to encode and deliver the determined block to the corresponding M×N transformer 640 or A×B transformer 642.

In particular, encoding mode determiner 630 determines whether to encode the M×N residual block from subtractor 620 by the A×B block or the M×N block and then delivers the M×N residual block to M×N transformer 640 or the A×B residual block to A×B transformer 642. In other words, encoding mode determiner 630 checks the M×N residual block delivered from subtractor 620 through its entire residual signals for the presence of one or more residual signals larger than a predetermined amplitude of the impulsive component, i.e. impulsive component residual signals, whereupon it configurates the A×B residual block containing one or more of the impulsive component residual signals and delivers the same to A×B transformer 642. Here, encoding mode determiner 630 confirms the presence of the impulsive component residual signals by comparing the absolute values of the M×N residual block's entire residual signals with a predetermined value to see if one or more of the absolute values are equal to or greater than the predetermined value, and hence confirming such high values are contained in the residual block.

Figure 7:
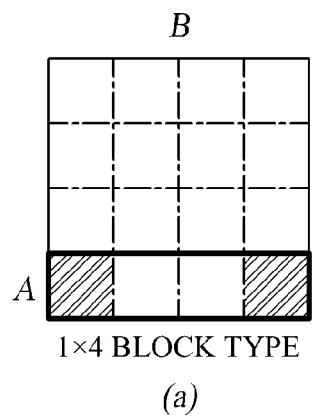
FIGS. 7A to 7B are exemplary diagrams for showing the constitutions of A×B residual blocks according to the disclosure.
Figure 7:
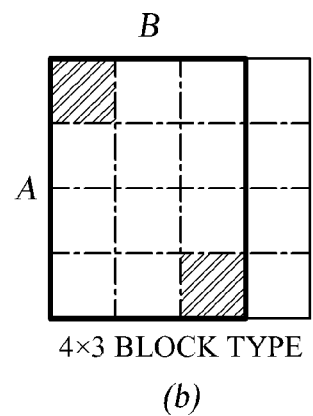
Figure 7:
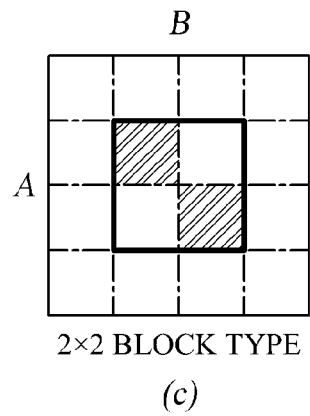
Figure 7:
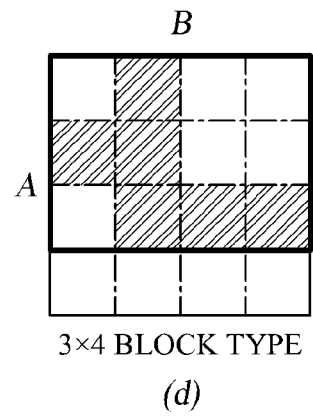

As shown in FIGS. 7A to 7D, the A×B residual block may be configured into rectangular blocks encompassing the entire impulsive component residual signals in the M×N residual block. In the A×B residual blocks, A and B represent the numbers of columns and rows in the rectangular blocks, respectively. As depicted in FIG. 7A, if the M×N residual block carries the impulsive component residual signals at its lowermost opposite ends, the A×B residual block is sized 1×4. To configurate such rectangular blocks that enclose the entire impulsive component residual signals in this way, the A×B residual blocks are sized 4×3, 2×2, and 3×4 as shown in FIGS. 7B, 7C, and 7C, respectively.

The residual signals of these configurations in the A×B residual blocks are processed into a bitstream by an A×B encoding wherein transform, quantization, and scanning are performed by the A×B block, while the remaining residual signals excluded from the A×B residual blocks are assumed to be negligibly small compared to the impulsive component residual signals and they may be encoded with an arbitrary value, for example '0' being assigned. Referring to FIG. 8A, as to an M×N residual block containing residual signals ×1 to ×16, an A×B residual block configurated into 3×3 size to encompass the shaded impulsive component residual signals ×6, ×9, and ×15 comes to include A×B residual blocks of ×5, ×6, ×7, ×9, ×10, ×11, ×13, ×14, and ×15 which are transformed, quantized, and scanned by the 3×3 block, and the remaining residual signals ×1 to ×4, ×8, ×12, and ×16, which may be assigned an arbitrary value such as '0' and encoded. However, '0' is to represent an exemplary value and '−1', '1' or other varieties may be applied.

Because the remaining residual signals excluded from the A×B residual block in the M×N residual block are assumed to be negligibly small relative to the impulsive component residual signals, the true values of the remaining residual signals need not be used and instead, an optimal performance replacement value or a correspondingly valued residual signal may be determined in the units of blocks, macroblocks, slices, pictures, etc. and the replacement residual signal value may be used for the values of the remaining residual signals excluded from the A×B residual block in reconstructing the M×N residual block. In addition, the determined residual signal value or its representative residual signal information may be encoded and included in the bitstream. At a later time in the decoder where the M×N residual block is reconstructed, the bitstream may allow extracting therefrom the replacement residual signal information, which helps to identify the replacement residual signal value to be used for the remaining residual signals excluded from the A×B residual block in the M×N block. For such replacement residual signal value, the best performance value in the encoder may be searched and set although it may be preset as '0', '−1', '1', or so in which case the replacement residual signal information may be neither generated nor included in the bitstream because the decoder can still use the preset value as the remaining residual signal to reconstruct the M×N residual block.

If a proper setting is made for the preset value 'a' for the purpose of identifying a residual signal of an impulsive component, a relatively small residual signal 'b' may be within a boundary as in −a<b<a (where 'a' is positive), and in the course of the steps of transform, quantization, inverse quantization, and inverse transform, it is susceptible to become other value than the original residual signal value of 'b' but value 'c'. For example, when 'b' is −2, 'b' subjected to the transform, quantization, inverse quantization, and inverse transform may add a quantization error toward a reconstruction of value 'c' of −3 and possibly develop further into the opposite polarity of +1.

As in the above example, the residual signals of small absolute values upon reconstruction through the transform, quantization, inverse quantization, and inverse transform may change near '0' between the opposite polarities of '+' and '−', the act of proper setting of the preset value 'a' for the purpose of identifying the impulsive component residual signal tends to converge the remaining residual signals of the A×B residual block to the value of '0' on the average. Therefore, through properly setting the preset value 'a' for identifying the impulsive component residual signal and having the remaining residual signals excluded from the A×B residual block in M×N block preset as '0', '−1', '1', or so, those remaining residual signals may be safely saved from a dedicated encoding process or a best performing replacement residual signal may be searched for an exclusive encoding of its value with no concern of a loss. Hence, it will be suffice to forgo the act of encoding the remaining residual signals and sending them to the decoder for the decoding operation or just to transmit the single replacement of the remaining residual signals as is or transmit the replacement encoded into the replacement residual signal information. When the decoder decodes such encoded bitstream, it can set the remaining residual signals as preset values including '0', '−1', '1', or the replacement residual signal value identified by the replacement residual signal information, whereby all of the original residual signals are reconstructed.

In addition, if the residual block contains the impulsive component residual signals, encoding mode determiner 630 may check whether the A×B residual block is smaller than the M×N residual block, and whereupon it delivers the A×B residual block to A×B transformer 642. That is, in configurating the A×B residual block containing the entire impulsive component residual signals, if the A×B residual block is equal to the M×N residual block in size reflecting the presence of the impulsive component residual signals all over the M×N residual block, then the encoding is performed in the conventional manner or by the M×N residual block.

On the other hand, if the residual block contains the residual signals without an impulsive component, encoding mode determiner 630 may deliver the M×N residual block to M×N transformer 640 to allow the encoding by the block sized equal to the current block with the M×N residual block's entire residual signals set to an arbitrary value such as '0'. With no impulsive component residual signal present in the residual block, because the values of the residual signals converge near '0' after being subjected to transform, quantization, inverse quantization, and inverse transform, the setting of '0' to enter the encoding can avoid a significant loss.

In addition, when encoding mode determiner 630 determines to encode the A×B residual block, it may generate mode information including one or more of block shape information of the A×B residual block, block positional information of the A×B residual block, and encoding identification information for identifying the A×B encoding and then deliver the same to encoder 670. Herein, the A×B encoding means an encoding operation of configuring the A×B residual block containing the impulsive component residual signals and processing the A×B residual block by the A×B block through prediction, transform, quantization, and scanning to enter the encoding. Encoding mode determiner 630 delivers the block shape information of the A×B residual block and the block positional information of the A×B residual block to A×B transformer 642.

For example, the A×B residual block's shape information may be information for specifying the block sizes such as 3×4, 2×3, etc., and the A×B residual block's positional information may be information for indicating a position of a first occurrence of an impulse component residual signal in the M×N residual block expressed in vertical and horizontal coordinates or information on the coordinates or others for indicating where the leftmost and uppermost residual signal in the A×B residual block falls on the M×N residual block. For encoding identification information that indicates the encoding was performed by the A×B blocks, a flag may be provided with a value '1' or '0' assigned, wherein the flag '1' indicates the encoding by the A×B block and the flag '0' indicates the encoding by the M×N block.

Upon receiving the A×B residual block shape information, the A×B residual block positional information, and the A×B residual block delivered from encoding mode determiner 630, A×B transformer 642 performs frequency transform by the A×B block to generate A×B residual blocks with frequency coefficients. A×B transformer 642 may operate in various transform methods. For example, it can perform one-dimensional transforms with respect to the residual signals in the respective rows and columns.

Figures 8, 9:
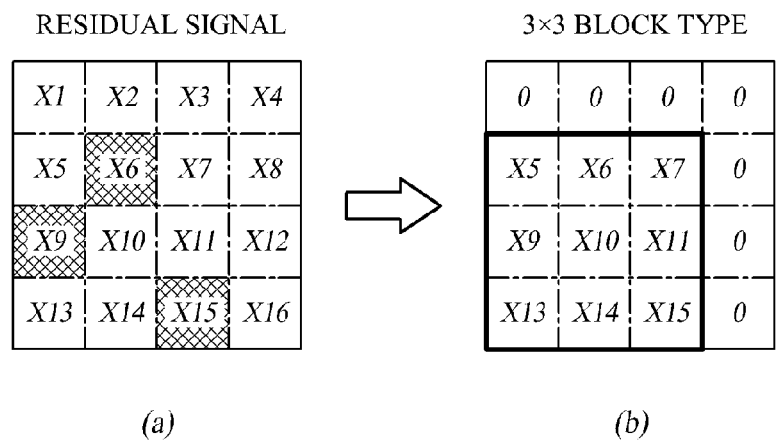
FIG. 8 is an exemplary diagram for assigning an arbitrarily set value to remaining residual signals.
FIG. 9 is an exemplary diagram for showing a procedure of transform by the A×B block to the frequency domain.

Referring to FIG. 9, it is possible to perform transform through a matrix multiplication as equation Y=A×B. In FIG. 9, matrix X represents the A×B residual block sized 3×2, matrix A represents a matrix including one-dimensional horizontal basis vector {(a1, a2, a3), (b1, b2, b3), (c1, c2, c3)} having a length A, and matrix B represents a matrix including one-dimensional vertical basis vector {(d1, d2), (e1, e2)} having a length B. Matrix Y is the multiplication of matrices A, X, and B and it represents vertically and horizontally transformed transform coefficients. The remaining residual signals having smaller values than the impulsive component residual signals can be assumed negligibly valued small and they can be assigned '0'.

A×B quantizer 652 quantizes the A×B residual block transformed by A×B transformer 642 to generate a residual block having quantized frequency coefficients. To this end, A×B quantizer 652 may perform the quantization using quantization step (Q step) which is given according to a quantization parameter (QP).

Scanner 660 generates a quantized frequency coefficient sequence by using existing scanning methods such as zig-zag scanning with respect to quantized frequency coefficients of the M×N residual block quantized by M×N quantizer 650, or generates the quantized frequency coefficient sequence by using varying scanning methods by the A×B block shapes with respect to quantized frequency coefficients of the A×B residual block quantized by A×B quantizer 652.

Figure 10:
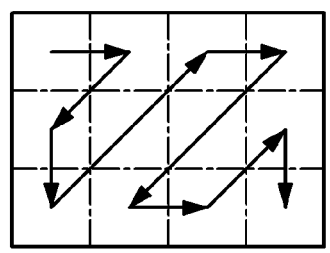
FIG. 10 is an exemplary diagram for showing differently scanning A×B blocks by their shapes according to the disclosure.
Figure 10:
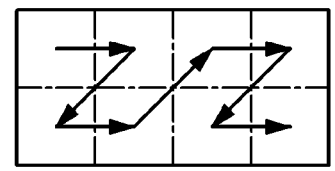
Figure 10:
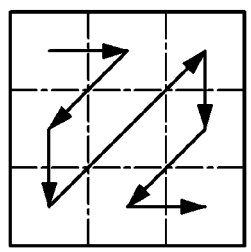
Figure 10:

For example, if the flag value is '0' whereby the encoding identification information is indicative of the M×N encoding, scanner 660 is adapted to typically zig-zag scan the quantized frequency coefficients of the M×N residual block quantized by M×N quantizer 650, while it takes a scanning method corrected from the zig-zag scan according to the A×B block shape to perform on the quantized frequency coefficients of the A×B residual block quantized by A×B quantizer 652 if the flag value is '1' whereby the encoding identification information is indicative of the A×B encoding. Such a corrected scanning method may be the one as illustrated in FIG. 10 and it may be varied depending on the A×B block shapes.

Encoder 670 encodes the quantized frequency coefficient sequence scanned in scanner 660 using various coding techniques including the entropy coding to generate the bitstream. At this time, encoder 607 may insert the mode information delivered from encoding mode determiner 630.

M×N inverse quantizer 680 performs inverse quantization on the quantized frequency coefficients of the M×N residual block quantized by M×N quantizer 650 to generate M×N residual block with the frequency coefficients, and M×N inverse transformer 690 performs inverse transform on the frequency coefficients of the M×N residual block inverse quantized by M×N inverse quantizer 680 to generate a reconstructed M×N residual block with reconstructed residual signals.

A×B inverse quantizer 682 performs inverse quantization on the quantized frequency coefficients of the A×B residual block quantized by A×B quantizer 652 to generate A×B residual block with the frequency coefficients, and A×B inverse transformer 692 performs inverse transform on the frequency coefficients of the A×B residual block inverse quantized by A×B inverse quantizer 682 to generate a reconstructed A×B residual block with reconstructed residual signals. Here, the A×B inverse quantization and the A×B inverse transform may be done in reverse of the A×B quantization and the A×B transform.

Video encoding apparatus 600 has an M×N residual block generator 694 for reconstructing the M×N residual block with the replacement of A×B residual block entered into the corresponding position in the M×N residual block. This substitution in position may be made by M×N residual block generator 694 using the A×B residual block's positional information, and the remaining residual signals excluded from the A×B residual block are assigned an arbitrary value such as '0', whereby generating the eventual M×N residual block.

Adder 696 adds the predicted block in predictor 610 to the reconstructed M×N residual block delivered from M×N residual block generator 694 to reconstruct the current block. The current blocks so reconstructed are accumulated by the picture and stored as reference pictures, which may be used to predict the next block.

Figure 11:
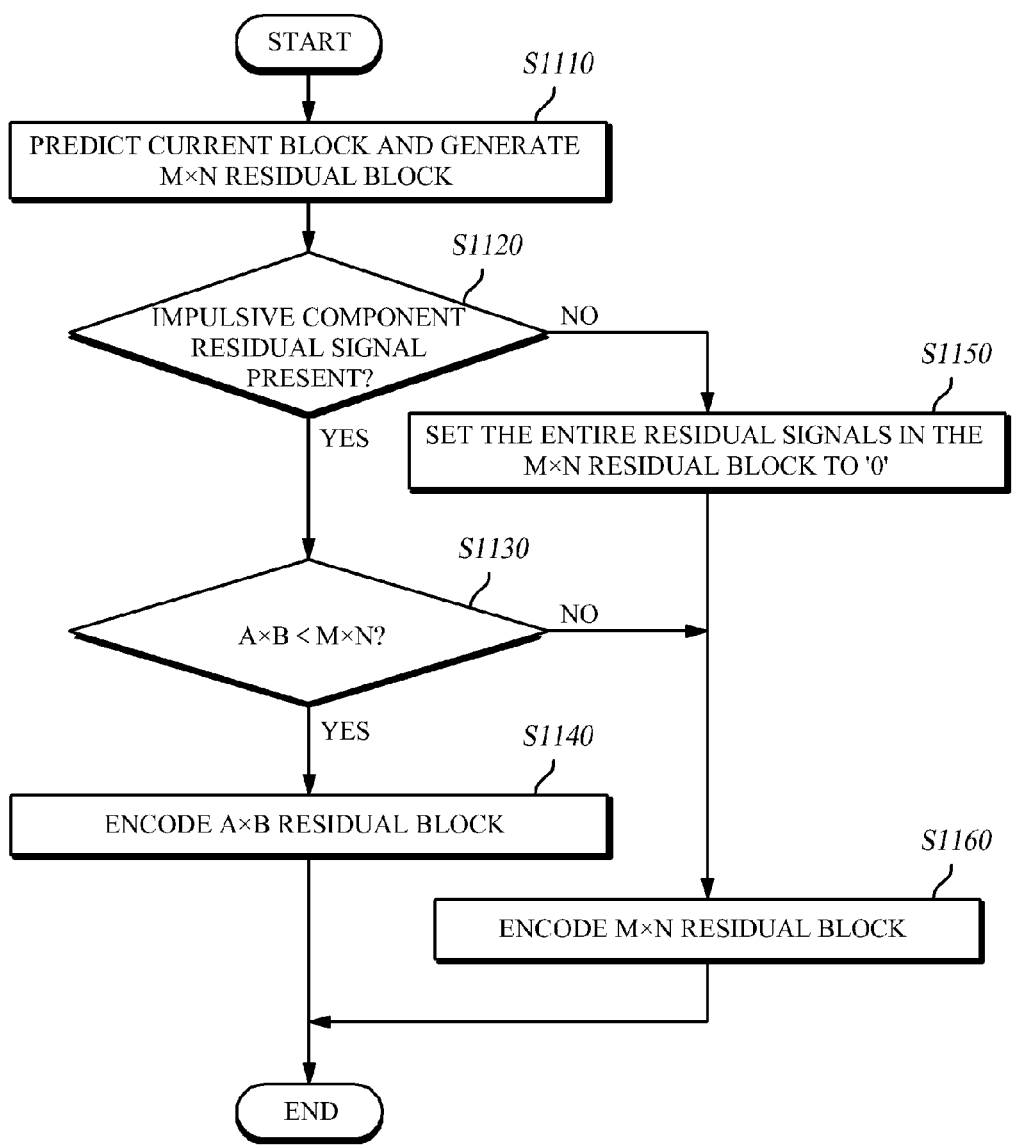
FIG. 11 is a flow diagram for illustrating a video encoding method according to a first aspect.

FIG. 11 is a flow diagram for illustrating a video encoding method according to a first aspect.

Upon receiving the video to be encoded, video encoding apparatus 600 classifies the video by the macroblock or macroblock's sub-block and determines an optimal encoding mode among various coding modes including an inter-prediction mode or intra-prediction mode in order to encode by predicting the current block to be encoded in the determined coding mode. At this time, in the event the intra mode is elected as the coding mode for performing intra-prediction, video encoding apparatus 600 predicts the current block to be encoded to generate a predicted block, and subtracts the predicted block from the current block to generate a residual block in step S1110, where if the current block is sized M×N, an M×N residual block of M×N size is generated.

Video encoding apparatus 600 analyzes the residual signals inside the M×N residual block to check if an impulsive component residual signal is present in step S1120. If step S1120 confirms the presence of the impulsive component residual signal, video encoding apparatus 600 configurates an A×B residual block containing the impulsive component residual signal, and checks if the size of A×B residual block is smaller than the M×N residual block in step S1130, and only if so, it encodes the A×B residual block to generate a bitstream in step S1140. As to the method of encoding the A×B residual block, the above descriptions with reference to FIG. 6 to 10 apply.

On the other hand, if video encoding apparatus 600 finds in step S1120 that the impulsive component residual signal is absent in the residual block, it sets the entire residual signals in the M×N residual block to '0' in step S1150, and encodes the M×N residual block to generate a bitstream in step S1160. In addition, if video encoding apparatus 600 finds in step S1130 that even though the impulsive component residual signal is present in the residual block the size of A×B residual block not is smaller than but equal to the M×N residual block, it proceeds to step S1160 and encodes the M×N residual block. At this time, the M×N residual block to be encoded is the residual block that bypassed the step S1150 or the M×N residual block generated in step S1110.

In this method of encoding operation, the small residual blocks containing the impulsive component residual signals are exclusively encoded leaving the rest residual signals out of the encoding process by setting them to a predetermined value including '0', '−1', '1', etc. and alternatively encoding a replacement residual signal with the optimal performance that represents the rest residual signals, thereby reducing the amount of the bitstream to be generated through encoding, improving the video compression efficiency.

The video encoded by video encoding apparatus 600 into the bitstream may then be transmitted in real time or non-real-time to video decoding apparatuses for decoding the same before its reconstruction and reproduction into the video via a wired/wireless communication network including the Internet, a short range wireless communication network, a wireless LAN network, WiBro (Wireless Broadband) also known as WiMax network, and mobile communication network or a communication interface such as cable or USB (universal serial bus).

Figure 12:
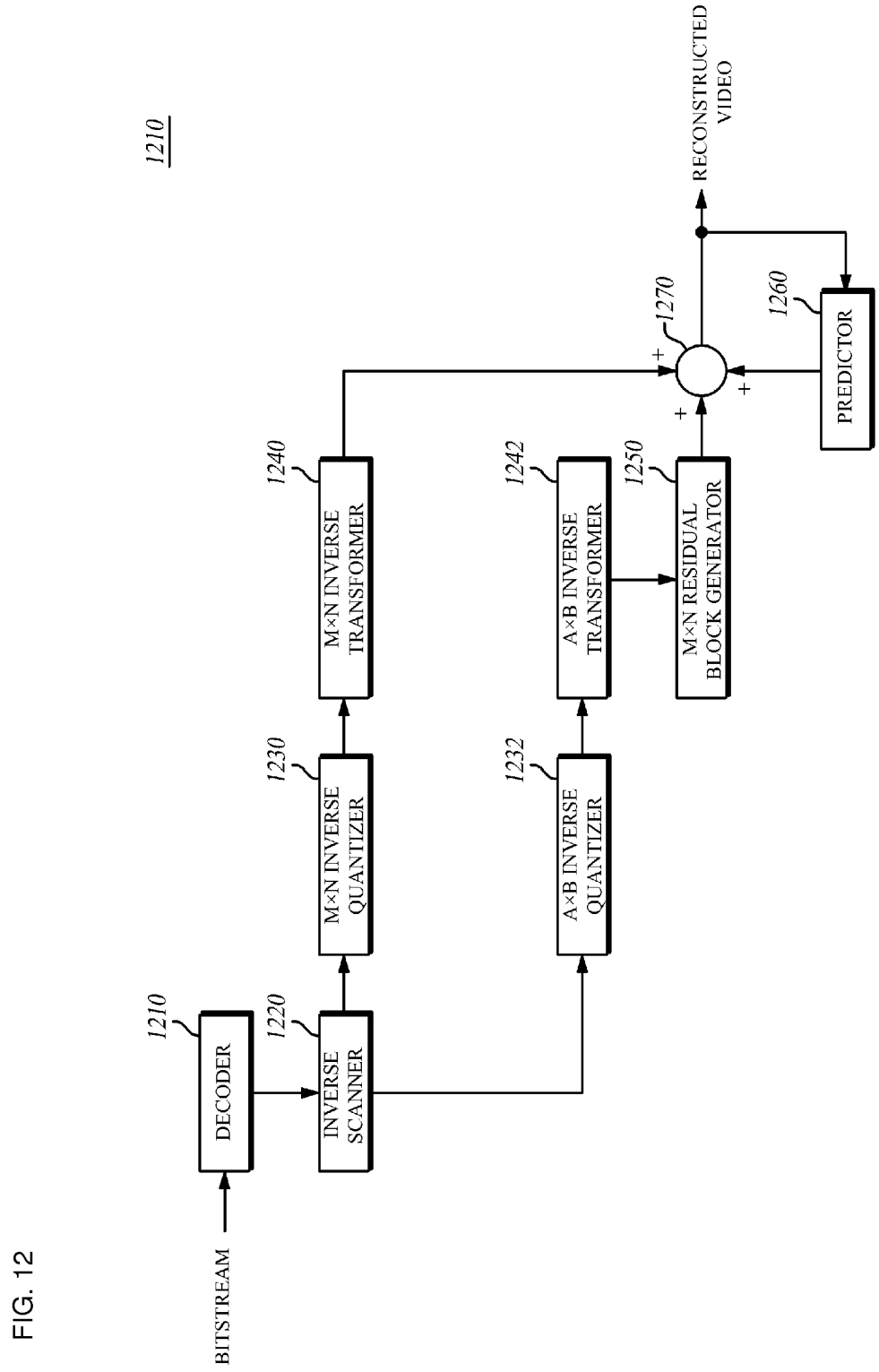
FIG. 12 is a schematic block diagram for showing a configuration of a video decoding apparatus according to a first aspect.

FIG. 12 is a schematic block diagram for showing a configuration of a video decoding apparatus 1200 according to a first aspect of the disclosure.

Video decoding apparatus 1200 may comprise a decoder 1210, inverse scanner 1220, an M×N inverse quantizer 1230, an A×B inverse quantizer 1232, an M×N inverse transformer 1240, an A×B inverse transformer 1242, an M×N residual block generator 1250, a predictor 1260, and an adder 1270.

Video encoding apparatus 1200 may be a personal computer or PC, notebook or laptop computer, personal digital assistant or PDA, portable multimedia player or PMP, PlayStation Portable or PSP, or mobile communication terminal, smart phone or such devices, and may represent a variety of apparatuses equipped with, for example, a communication system such as a modem for carrying out communications between various devices or wired/wireless communication networks, a memory for storing various programs for encoding videos and related data, and a microprocessor for executing the programs to effect operations and controls.

Decoder 1210 decodes the bitstream, from which it extracts a quantized frequency coefficient sequence for delivery to inverse scanner 1220. At the same time, decoder 1210 may extract mode information from the bitstream, the mode information being possibly the same as the mode information described above with reference to FIG. 6 and delivered to inverse scanner 1220.

Inverse scanner 1220 may perform inverse scanning on the quantized frequency coefficient sequence delivered from decode 1210 and specifically it follows the mode information from decoder 1210 to use the typical zig-zag scanning method for inverse scanning the quantized frequency coefficient sequence and generating the M×N residual block with the quantized frequency coefficients, or it uses a scanning method modified following the A×B block shape for inverse scanning the quantized frequency coefficient sequence and generating the A×B residual block with the quantized frequency coefficients. For example, if the flag that represents the encoding identification information included in the mode information is '0', the inverse scanning of the quantized frequency coefficient sequence may be made by the typical zig-zag scanning method, whereas if the flag representative of the encoding identification information is '1', the inverse scanning of the quantized frequency coefficient sequence may be made by modified zig-zag scanning methods depending on the block shapes as identified by the A×B block shape information contained in the mode information. This modified zig-zag scanning may be carried out in the reverse sequence to the scanning process described with reference to FIG. 10. Upon generating the respective residual blocks through performing a variety of inverse scanning methods from the mode information, inverse scanner 1220 directs the generated residual block that is the M×N residual block to M×N inverse quantizer 1230 and the A×B residual block to A×B inverse quantizer 1232.

M×N inverse quantizer 1230, M×N inverse transformer 1240, A×B inverse quantizer 1232, and A×B inverse transformer 1242 perform the same or similar functions as the described M×N inverse quantizer 680, M×N inverse transformer 690, A×B inverse quantizer 682, and A×B inverse transformer 692 in FIG. 6 and their detailed explanations are not repeated.

M×N residual block generator 1250 reconstructs the M×N residual block by entering a replacement of A×B residual block from A×B inverse transformer 1242 into the corresponding position in the M×N residual block.

This substitution in position may be made by M×N residual block generator 1250 using the A×B residual block's positional information extracted by decoder 1210 from the bitstream, and the remaining residual signals excluded from the A×B residual block are assigned a predetermined arbitrary value such as '0', '−1', '1', etc., or if there were an extraction of replacement residual signal information from the bitstream, they are assigned the value of a replacement residual signal identified by the replacement residual signal information, whereby generating the eventual M×N residual block.

Predictor 1260 predicts the current block to generate a predicted block, and adder 1270 adds the predicted block from M×N inverse transformer 1240 or from M×N residual block generator 1250 to the predicted block in predictor 1260. The current blocks reproduced in this way may be accumulated by the picture and then outputted in a reproduced video or stored as reference pictures so that they may be used to predict the next block.

Figure 13:
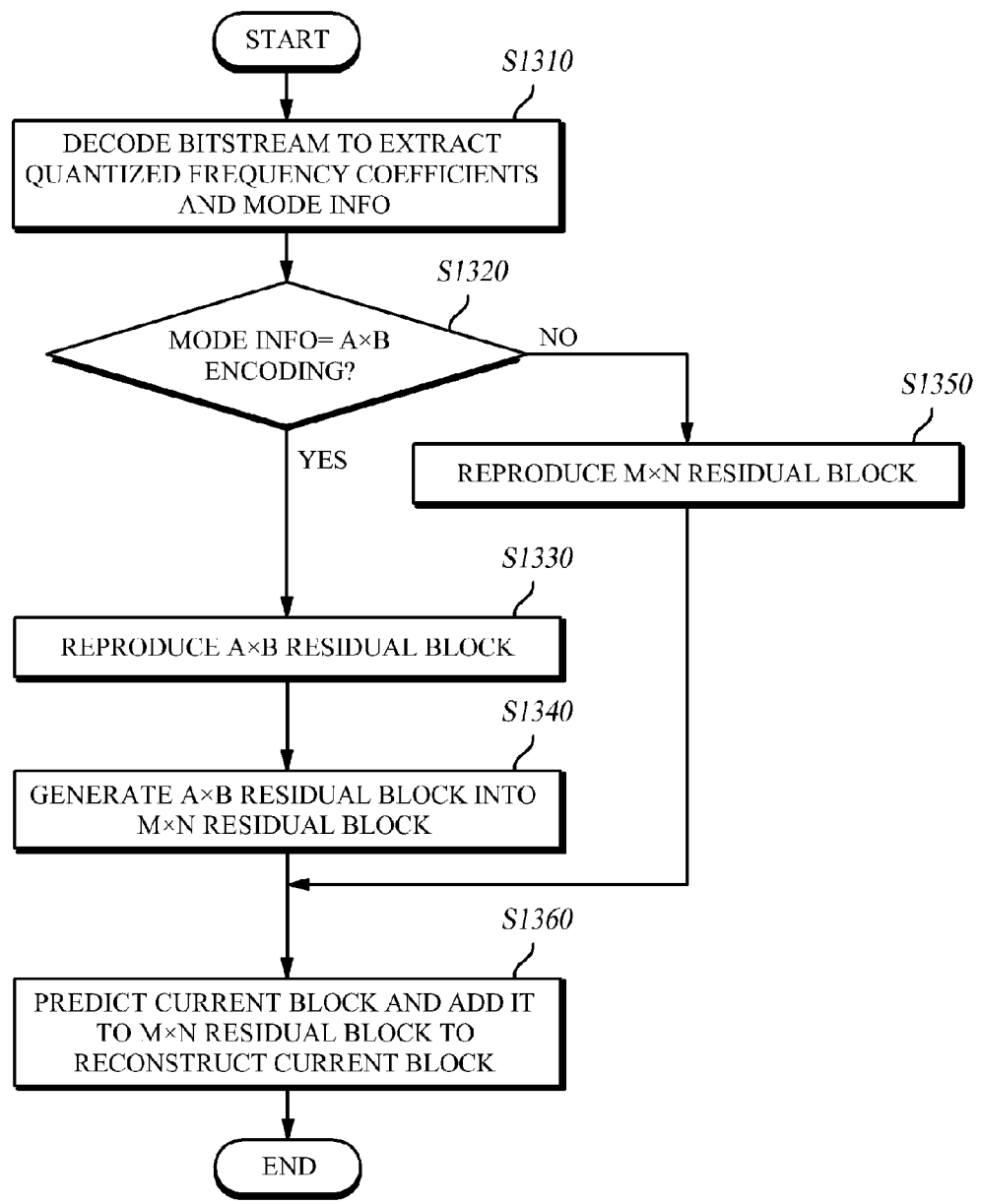
FIG. 13 is a flow diagram for illustrating a video decoding method according to a first aspect.

FIG. 13 is a flow diagram for illustrating a video decoding method according to a first aspect of the disclosure.

Video decoding apparatus 1200, which has received the bitstream for a video via the wired/wireless communication network or cable and stored the same, is adapted to reproduce the video according to a user selected algorithm or an algorithm of an alternative running program by decoding the video first.

For this purpose, video decoding apparatus 1200 decodes a bitstream and extracts a residual block in step S1310. At the same time, video decoding apparatus 1200 extracts mode information from the bitstream.

Video decoding apparatus 1200 checks the mode information for determining whether it contains encoding identification information for identifying the A×B encoding in step S1320, if it does, performs an inverse scanning of the A×B residual block according to block shape information contained in the mode information followed by inverse quantization and inverse transform by the A×B block in order to reproduce the A×B residual block in step S1330, and then performs a replacement of the reproduced A×B residual block into the M×N residual block according to block's positional information contained in the mode information and assigns the remaining residual signals excluded from the A×B residual block a predetermined arbitrary value or the value of a replacement residual signal identified by replacement residual signal information extracted from the bitstream, whereby reconstructing the M×N residual block in step S1340. To the contrary, if video decoding apparatus 1200 determines in step S1320 that the mode information does not contain the encoding identification information for identifying the A×B encoding, it runs the M×N residual block through the typical scanning method followed by inverse quantization and inverse transform to reproduce the same in step S1350.

Video decoding apparatus 1200 predicts the current block to generate a predicted block, and adds the same in step S1360 to the M×N residual block that was reproduced in step S1340 or step S1350. In this way, the reproduced current blocks may be accumulated by the picture and then outputted in a reproduced video or stored as reference pictures so that they may be used to predict the next block.

Figure 14:
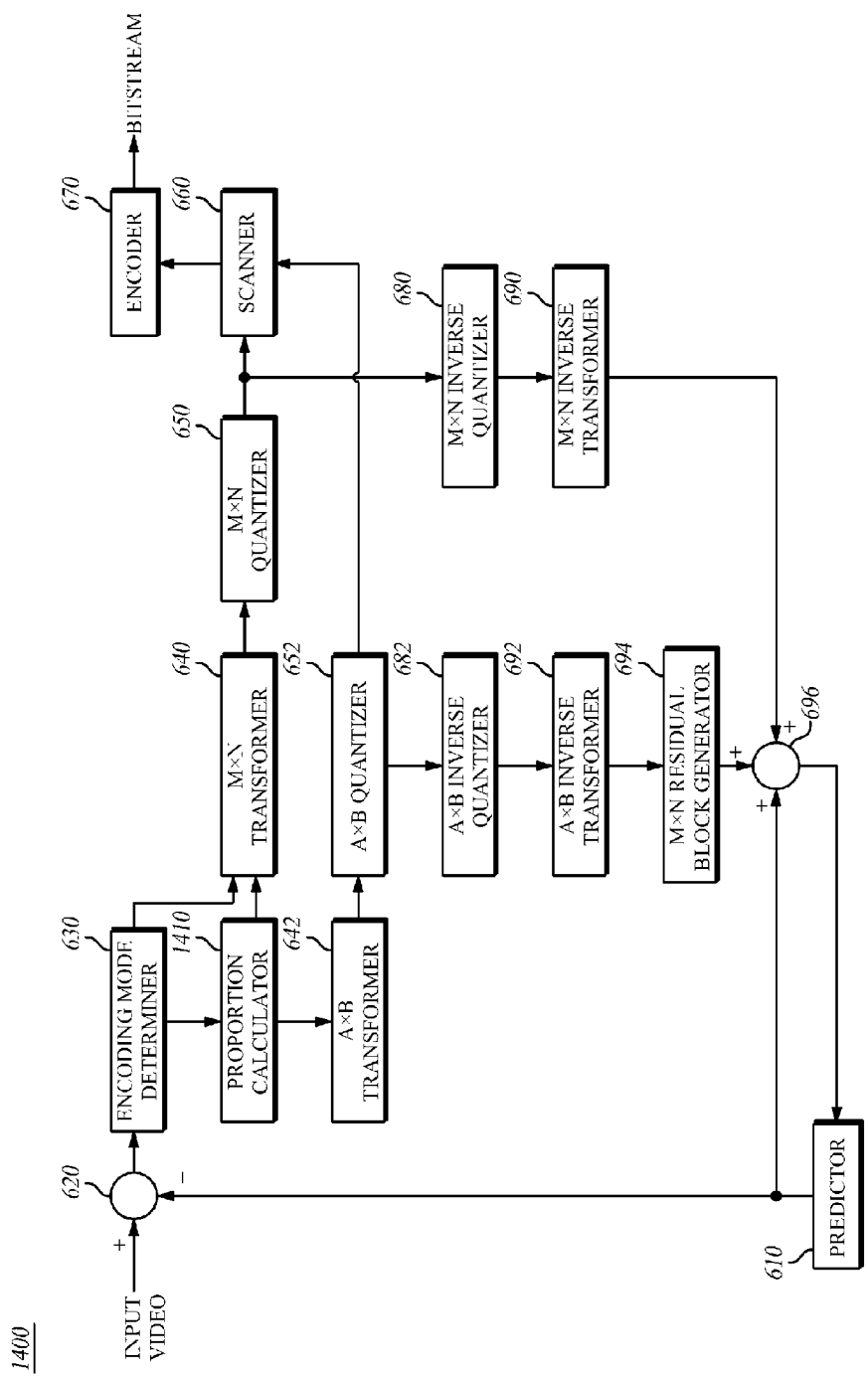
FIG. 14 is a schematic block diagram for showing a configuration of a video encoding apparatus according to a second aspect.

FIG. 14 is a schematic block diagram for showing a configuration of a video encoding apparatus 1400 according to a second aspect of the disclosure.

Video encoding apparatus 1400 is to encode a video and further comprises a proportion calculator 1410 above all of the components of video encoding apparatus 600 of the first aspect. Similar to video encoding apparatus 600 described as depicted in FIG. 6, video encoding apparatus 1400 performs an A×B encoding on the A×B residual block that contains the impulsive component residual signal, except that it determines whether to perform the A×B encoding depending on an impulse proportion ratio, by which the impulsive component residual signals occupy among the entire residual signals in the A×B residual block. In the following, a detailed description of the remaining components described with reference to FIG. 6 will be omitted from repetition.

Upon receiving the A×B residual block delivered after determining the A×B encoding, proportion calculator 1410 calculates the impulse proportion ratio (the number of the impulsive component residual signals in the A×B residual block divided by the number of the total residual signals in the A×B residual block), by which the impulsive component residual signals occupy among the entire residual signals in the A×B residual block, compares the impulse proportion ratio with a predetermined threshold to see if the ratio is equal to or greater than the threshold, whereupon delivering the A×B residual block and mode information to A×B transformer 642 or if the ratio is less than the threshold, calculator 1410 lets the M×N residual block to be encoded in the typical method by delivering the M×N residual block to M×N transformer 640 or controls encoding mode determiner 620 to deliver the M×N residual block to M×N transformer 640. Therefore, only if the impulse proportion ratio is equal to or greater than the threshold, the flag indicative of the encoding identification information may be set to '1' which represents the performance of the A×B encoding, whereby the encoding identification information, block shape information, and block positional information may be delivered to A×B transformer 642, whereas if the impulse proportion ratio is less than the threshold, the flag indicative of the encoding identification information may be set to '0'.

Figure 15:
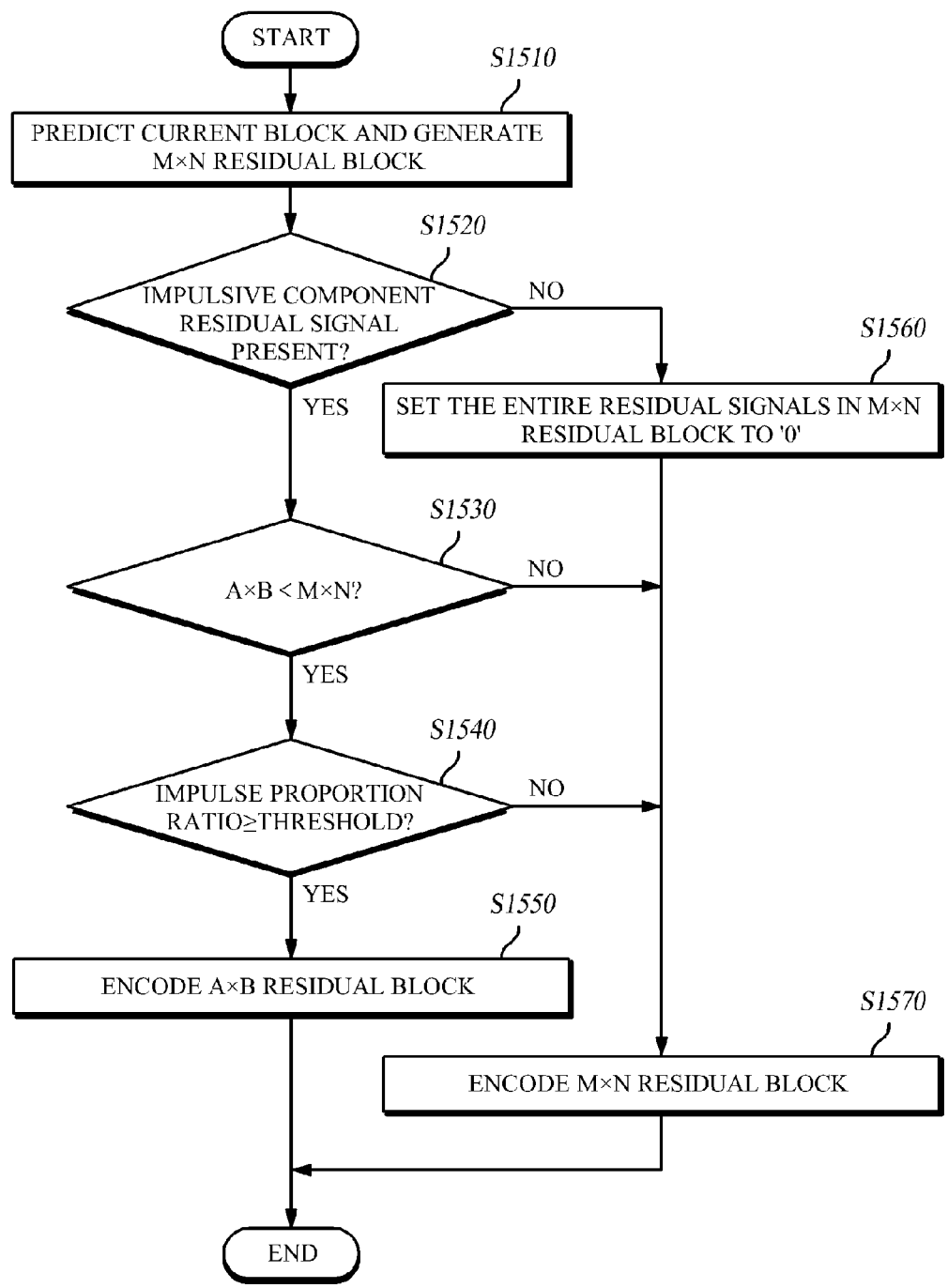
FIG. 15 is a flow diagram for illustrating a video encoding method according to a second aspect.

FIG. 15 is a flow diagram for illustrating a video encoding method according to a second aspect of the disclosure.

This aspect of the video encoding method has steps S1510 to S1530 that are equal or similar to steps S1110 to step S1130 described with reference to FIG. 11, and has steps S1550 to S1570 that are equal or similar to steps S1140 to step S1160 described with reference to FIG. 11. However, in the video encoding method according to a second aspect, if step S1530 finds the A×B residual block being smaller than the M×N residual block, proportion calculator 1410 calculates the impulse proportion ratio and compares it to a predetermined threshold in step S1540, and only if the impulse proportion ratio is equal to or greater than the threshold, it proceeds to step S1550 for encoding the A×B residual block to generate a bitstream, and if the impulse proportion ratio is less than the threshold, it proceeds to step S1570 for encoding the M×N residual block to generate the bitstream.

A video decoding apparatus according to a second aspect of the disclosure is constructed like video decoding apparatus 1200 according to the first aspect, and the method for encoding the video to generate the bitstream is also same as the first aspect of video decoding method described with reference to FIG. 11. This is because video encoding apparatus 1400 might apply different encoding methods by changing impulse proportion ratios as the decoding method remains unchanged.

Figure 16:
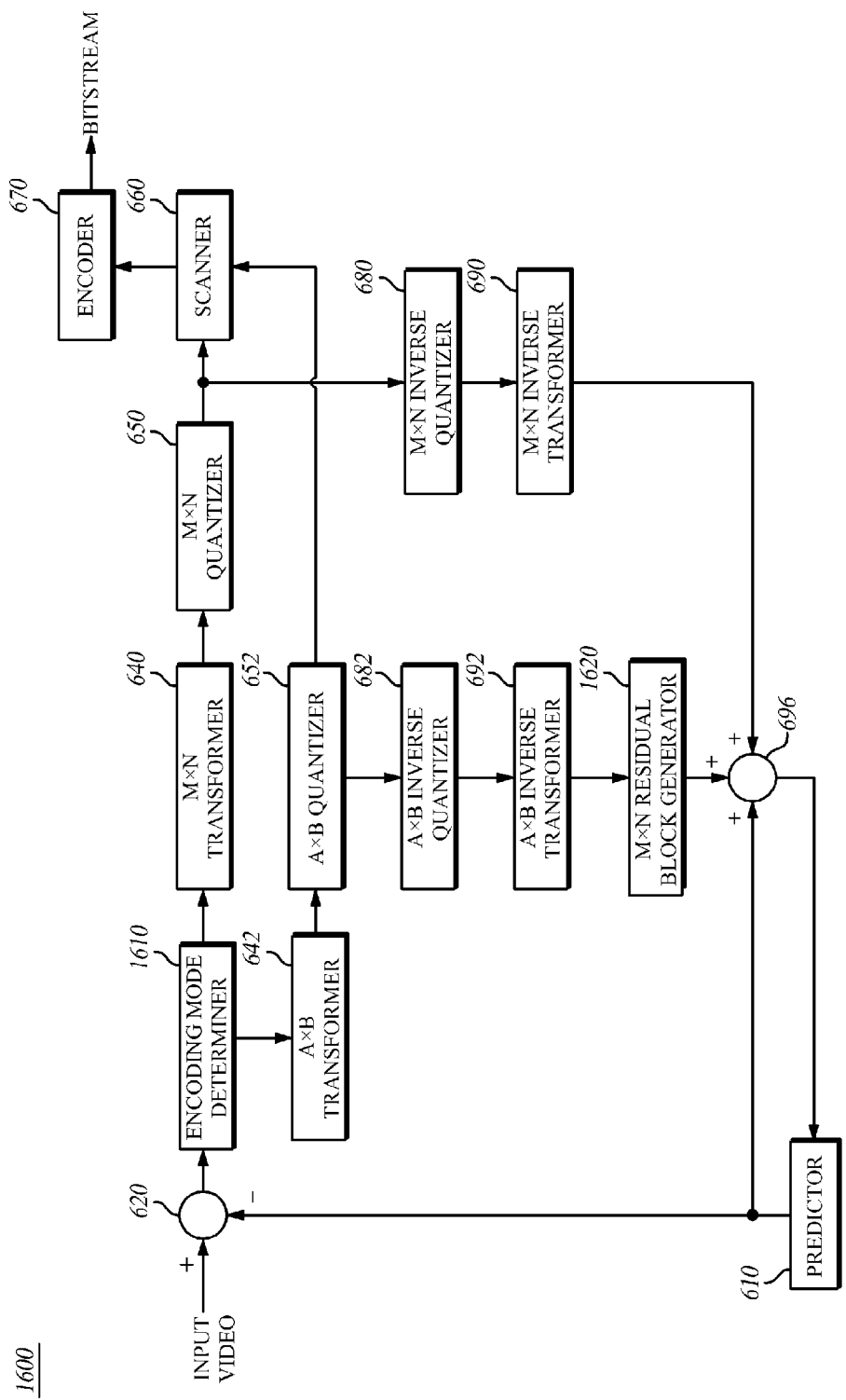
FIG. 16 is a schematic block diagram for showing a configuration of a video encoding apparatus according to a third aspect.

FIG. 16 is a schematic block diagram for showing a configuration of a video encoding apparatus 1600 according to a third aspect of the disclosure.

Video encoding apparatus 1600 comprises all of the components of video encoding apparatus 600 of the first aspect described with reference to FIG. 6. An exception is that video encoding apparatus 1600 has an encoding mode determiner 1610 and an M×N residual block generator 1620 which function somewhat differently from their counterparts of encoding mode determiner 630 and M×N residual block generator 694.

Specifically, encoding mode determiner 1610 of video encoding apparatus 1600 according to the third aspect may configurate the A×B residual blocks containing the impulsive component residual signals so that they are shaped as diagonally positioned formations as well as rectangles.

To this end, in configurating the A×B residual block, encoding mode determiner 1610 determines whether the M×N residual block lacks a diagonal form of the impulsive component residual signals, and if so, it sets the described rectangular block shape of A×B residual block, and otherwise it sets the diagonal formation of the A×B residual blocks at presence of the diagonal form in the M×N residual block.

Figure 17:
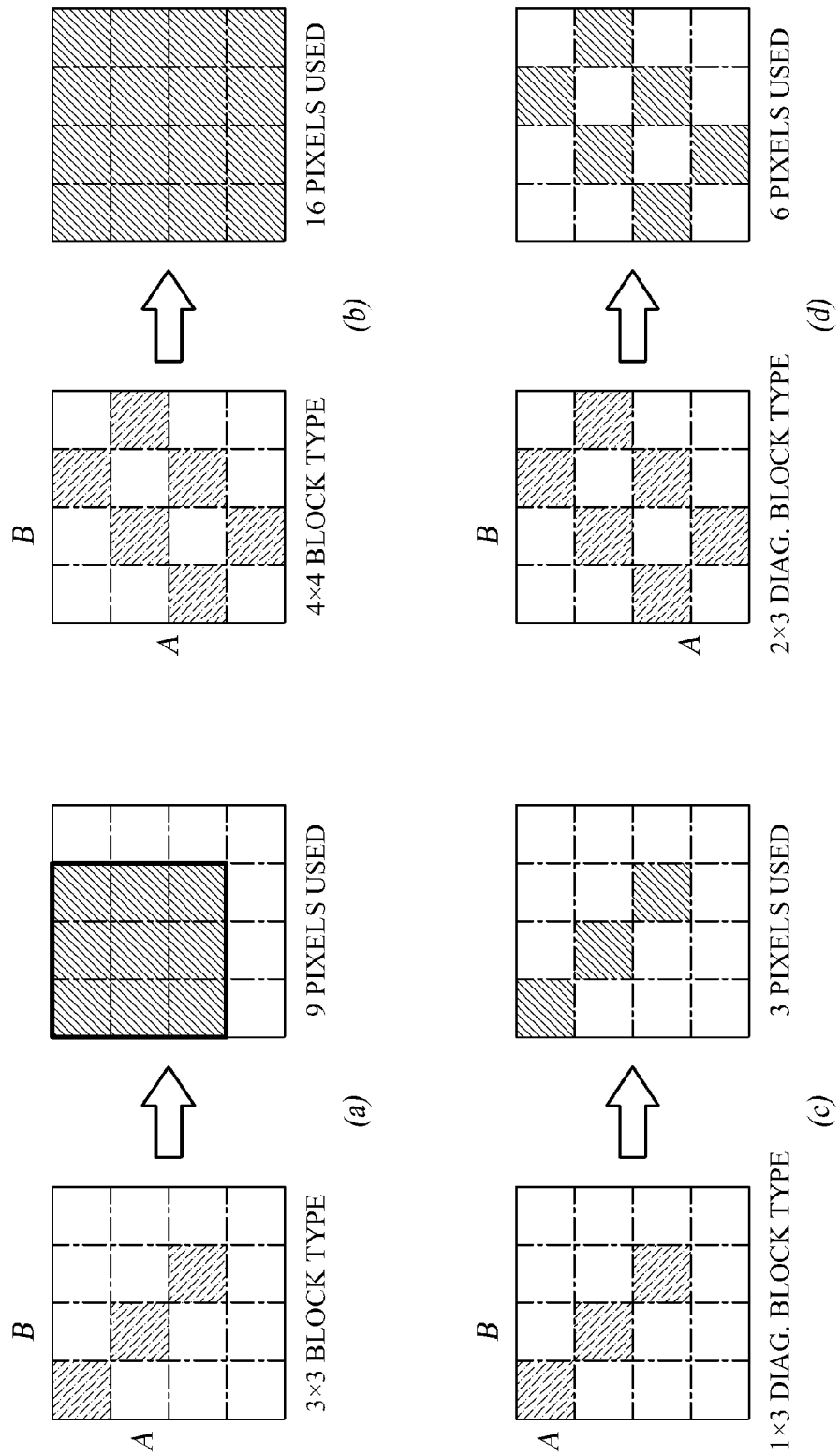
FIG. 17 is an exemplary diagram for showing a configuration of the A×B residual blocks as diagonal blocks according to a third aspect.

Referring to FIG. 17, assuming the M×N residual block is a 4×4 sized block and three diagonally positioned residual signals are the impulsive component residual signals, when configurating the A×B residual block in the first aspect of the disclosure as shown in the drawing at (A), the A×B residual block becomes a 3×3 sized block with six residual signals needed to be encoded. On the other hand, when configurating the A×B residual block in the third aspect as shown at (C), it becomes a 1×3 sized block requiring only three residual signals to encode.

Similarly, assuming the M×N residual block is a 4×4 sized block and three diagonally positioned residual signals in a pair are the impulsive component residual signals, when configurating the A×B residual block in the first aspect of the disclosure as shown at (B), the A×B residual block becomes the same 4×4 sized block as the M×N residual block with sixteen residual signals needed to be encoded. On the other hand, when forming the A×B residual block in the third aspect as shown at (D), it becomes a smaller 2×3 sized block relative to the M×N residual block requiring only six residual signals to encode.

Therefore, as can be seen from FIG. 17, configurating the A×B residual block in the third aspect can save the A×B residual block from becoming as large as the M×N residual block as well as shrink its size to correspondingly reduce the number of residual signals to encode, and furthermore when combined with the second aspect of the disclosure in its implementation, it can increase the impulse proportional ratio toward better chances of performing the A×B encoding, resulting in an even further improvement of the video compression efficiency.

In addition, encoding mode determiner 1610 generates diagonal block identification information for indicating that the A×B residual block was configured in a diagonal block shape and diagonal positional information for indicating the positions of the respective impulsive component residual signals that caused such diagonal formation of the A×B residual block, as mode information, and delivers the latter to M×N residual block generator 1620.

Upon receiving the reconstructed A×B residual block delivered from A×B inverse quantizer 692, M×N residual block generator 1620 generates the M×N residual block as it identifies through the diagonal block identification information delivered from A×B inverse quantizer 692 that the reconstructed A×B residual block is the diagonal block shape of residual block, replaces the M×N residual block with the respective residual signals of the reconstructed A×B residual block in an arranged diagonal formation through the diagonal positional information, and assigns the remaining residual signals a predetermined arbitrary value such as '0', '−1', '1', etc., or the value of a replacement residual signal identified by the replacement residual signal information extracted from the bitstream.

Although not shown, a video decoding apparatus according to a third aspect of the present disclosure is equally constructed to video decoding apparatus 1200 according to the first aspect. An exception is that the mode information extracted from the bitstream in decoder 1210 now contains diagonal block identification information and diagonal positional information, which are delivered to M×N residual block generator 1250. As with M×N residual block generator 1620 described with reference to FIG. 16, M×N residual block generator 1250 uses the diagonal block identification information and diagonal positional information to replace the M×N residual block with the diagonally formed A×B residual block and assign the remaining residual signals the predetermined arbitrary value or the value of the replacement residual signal identified by the replacement residual signal information extracted from the bitstream, whereby generating the eventual M×N residual block.

In the mean time, as with M×N residual block generator 1620 described with reference to FIG. 16, video encoding apparatuses 600, 1400, 1600 in the first to third aspects predetermine whether the quantized frequency coefficients generated from transforming and quantizing the M×N residual block are commonly '0', and if so, they perform the M×N encoding, and alternatively the A×B encoding if one or more of the coefficients are not '0'. Specifically, it is possible to incorporate a coefficient identifier between M×N quantizer 650 and A×B quantizer 652 for checking the quantized frequency coefficients of the quantized residual block output from M×N quantizer 650 to deliver the same quantized residual block to scanner 660 without either generating mode information such as encoding identification information indicating an M×N encoding or inserting such information in the bitstream if all of the quantized frequency coefficients are '0', whereby allowing the typical M×N encoding to be performed, while only if one or more quantized frequency coefficients are not '0', the coefficient identifier delivers the quantized residual block outputted from either M×N quantizer 650 or A×B quantizer 652 to scanner 660 with inserting the mode information containing the encoding identification information for indicating the M×N encoding or the mode information containing the encoding identification information, block shape information, and block positional information for indicating the A×B encoding to the bitstream, whereby allowing either the M×N encoding or A×B encoding to be performed. Therefore, in the first to third aspects, video encoding apparatuses 600, 1400, 1600 are able to discern whether the quantized frequency coefficients generated from transform and quantization of the M×N residual block are all '0' not to include mode information in the bitstream or one or more such coefficients are not '0' only to include the mode information in the bitstream.

By the same token, video decoding apparatus 1200 according to the first to third aspects checks if quantized frequency coefficients reconstructed from decoding the bitstream are all '0' (alternatively, this is recognizable through a coded block pattern or CBP contained in the bitstream) in which case apparatus 1200 skips reading in the mode information from the bitstream to perform inverse quantization and inverse transform on the quantized frequency coefficients for reconstructing the M×N residual block and in turn the current block, or if one or more of the quantized frequency coefficients reconstructed by decoding the bitstream are not '0' (alternatively, CBP in the bitstream can tell the same) in which case apparatus 1200 does read in the mode information from the bitstream to judge by the encoding identification information between the M×N encoding and A×B encoding that had been performed. Here, if it was the M×N encoding, the M×N residual block is reconstructed to have the current block reconstructed, and in case of the A×B encoding, the block shape information and block positional information may be additionally read in to reconstruct the A×B residual block and eventually the current block.

Figure 18:
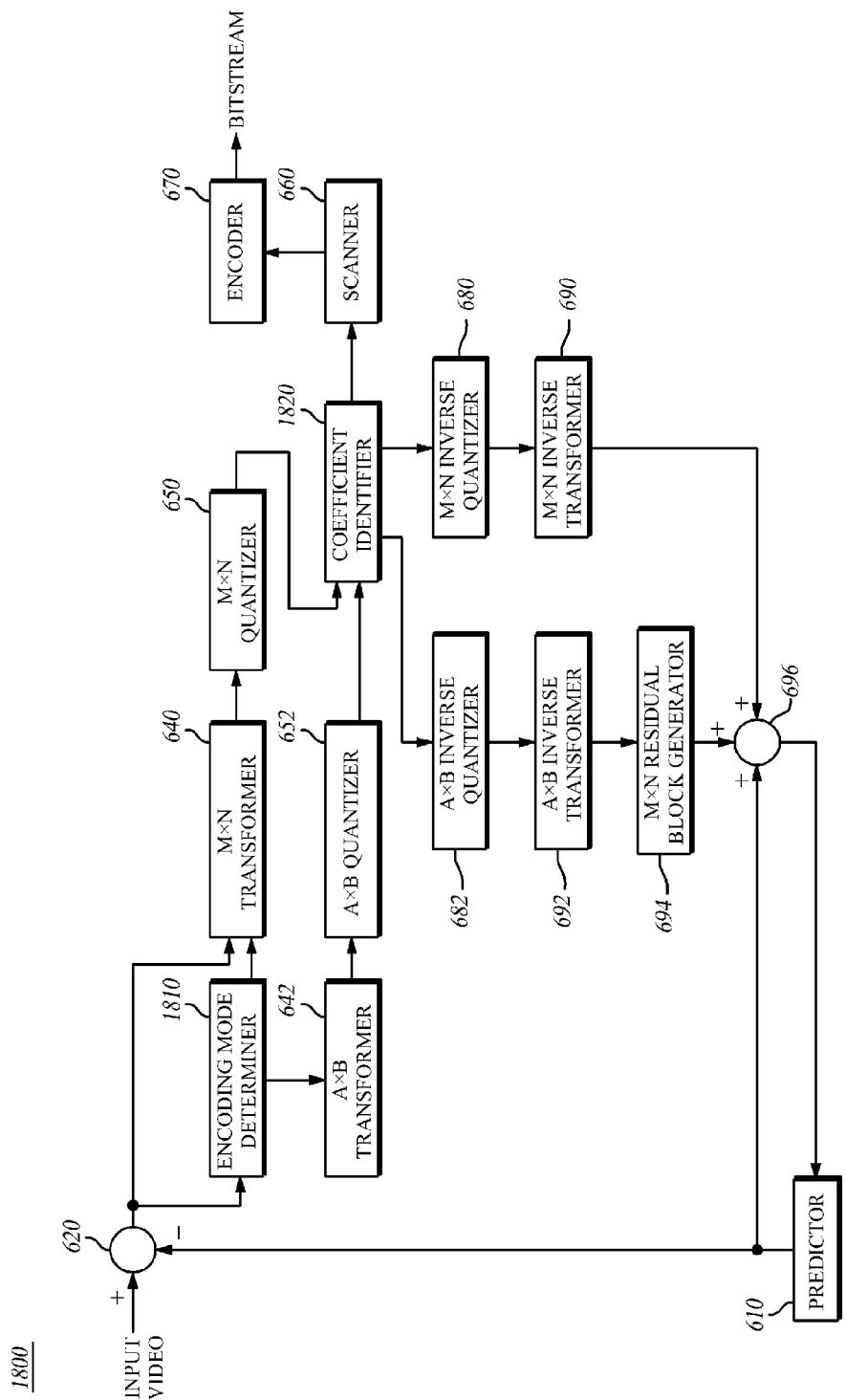
FIG. 18 is a schematic block diagram for showing a configuration of a video encoding apparatus according to a fourth aspect.

FIG. 18 is a schematic block diagram for showing a configuration of a video encoding apparatus 1800 according to a fourth aspect.

Video encoding apparatus 1800 further comprises a coefficient identifier 1820 above all of the components of video encoding apparatus 600 of the first aspect described with reference to FIG. 6 with a partially repurposed encoding mode determiner 1810. In the following, a detailed description of the remaining components described with reference to FIG. 6 will be omitted from repetition.

As with video encoding apparatus 600 of the first aspect, video encoding apparatus 1800 of the fourth aspect performs the A×B encoding to encode the A×B residual block containing the impulsive residual signals. An exception is that it is determined whether all of the frequency coefficient values of the quantized residual block after encoding the M×N residual block in the typical method are '0', and if so, apparatus 1800 performs the typical zig-zag scanning and encoding on the typically predicted, transformed, and quantized M×N residual block and thereby generating the bitstream, while if one or more coefficient values are not '0', it performs the A×B encoding wherein the prediction, transform, and quantization are carried out by the A×B block and different scanning methods are applied by the A×B block shapes before encoding them. Additionally, in the A×B encoding, it is determined whether the pixel number of the A×B residual block is equal to or less than a predetermined number, and if so, the A×B encoding is carried on, but if the threshold is exceeded, encoding is performed on the M×N residual block conventionally. For example, if the predetermined value is eight, the A×B encoding is performed on such a residual block with A times B being equal to or less than 8 while an M×N encoding is performed on a residual block, which excesses 8. On the residual blocks of such as 1×1, 2×3, 4×2 the A×B encoding is performed, since they are not larger than 8.

For this purpose, encoding mode determiner 1810 determines not only whether to carry out the A×B encoding as in encoding mode determiner 630 described with reference to FIG. 6 but also whether the A×B residual block pixel number in the A×B encoding is equal to or less than the predetermined number, and if so, it delivers the A×B residual block to A×B transformer 642 to perform the A×B encoding, while if the predetermined number is exceeded, it delivers the M×N residual block to M×N transformer 640 to perform encoding the same conventionally.

Coefficient identifier 1820 determines if all of the quantizer frequency coefficient values of the quantized residual block delivered from M×N quantizer 650 are '0', and if so, it supplies scanner 660 with the conventionally predicted, transformed, and quantized M×N residual block on which the typical zig-zag scanning is performed without incorporating the mode information that contains the encoding identification information indicative of the M×N encoding into the bitstream, while if one or more coefficient values are not '0', it determines whether the pixel number of the A×B residual block is equal to or less than a predetermined number, and only if so, incorporates the mode information that contains the encoding identification information indicative of the A×B encoding, block shape information, and block positional information into the bitstream, and relays the quantized A×B residual block delivered from A×B quantizer 652 to scanner 660 for scanning the same in different methods changing by the A×B block shapes. If the pixel number of the A×B residual block is equal to or less than the predetermined number, encoding is performed conventionally without incorporating the mode information that contains the encoding identification information indicative of the M×N encoding into the bitstream.

Figure 19:
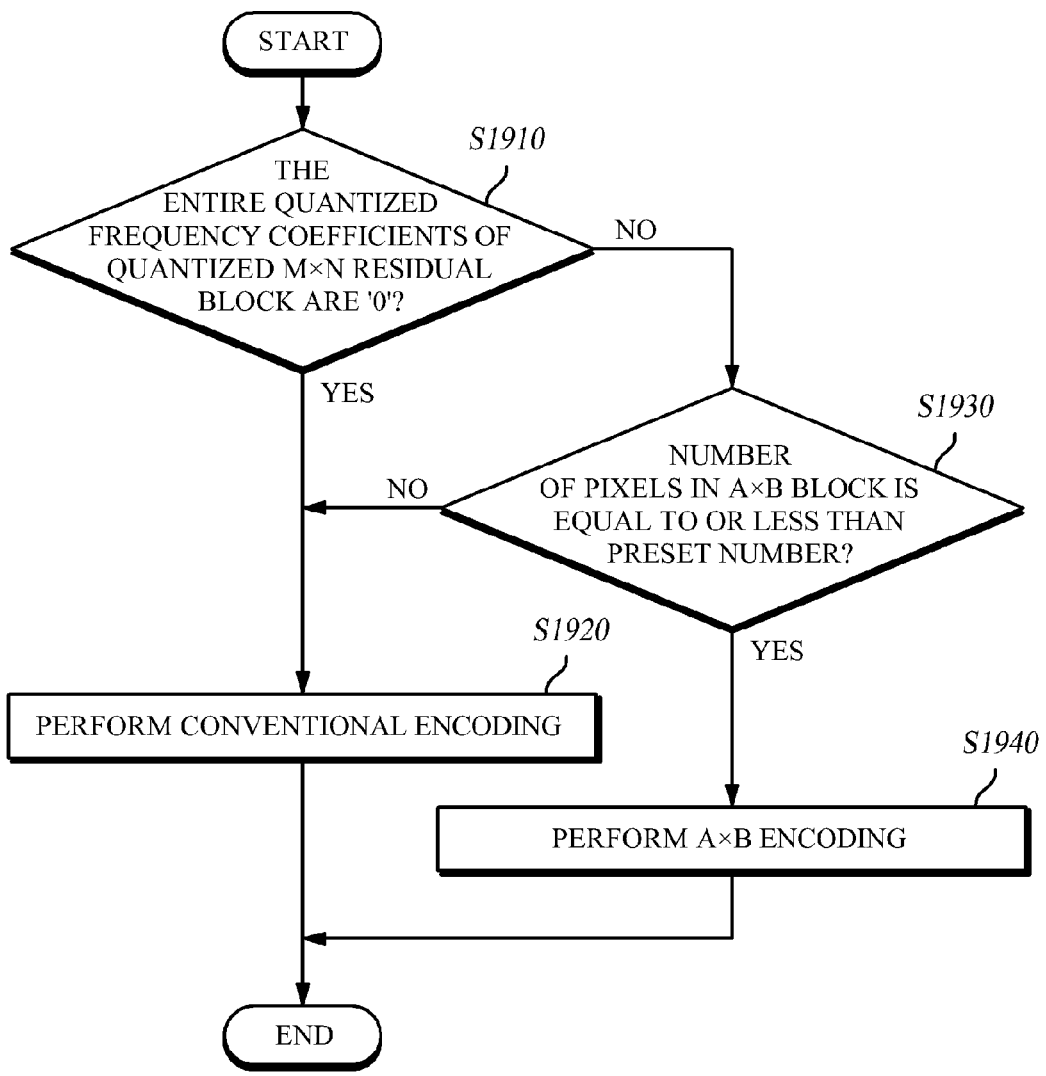
FIG. 19 is a flow diagram for illustrating a video decoding method according to a fourth aspect.

FIG. 19 is a flow diagram for illustrating a video decoding method according to a fourth aspect.

Video encoding apparatus 1800 determines whether the quantized frequency coefficients of the M×N residual block quantized in the conventional method of encoding by the M×N block are entirely '0' in step S1910. At the commonly '0' coefficients determined in step S1910, video encoding apparatus 1800 applies the conventional scanning such as zig-zag scanning to the quantized frequency coefficients encoded by the conventional method of encoding by the M×N block before encoding the same, thereby generating the bitstream in step S1920. If one or more quantized frequency coefficients are determined non-zero, video encoding apparatus 1800 checks the pixel number of the A×B residual block if it is equal to or less than a predetermined number in step S1930. If the predetermined number is exceeded, the method proceeds to step S1920, while if it is equal to or less than the predetermined number, the method performs the A×B encoding that operates on the A×B residual block by the A×B block and then generates the bitstream in step S1940.

According to the fourth aspect as described, upon predetermining that the quantized frequency coefficients of the M×N residual block quantized in the conventional method of encoding by the M×N block are commonly '0' and then determining the A×B residual block pixel number to be equal to or less than a predetermined number, the mode information containing the encoding identification information indicative of the M×N encoding or A×B encoding does not need to be included for every residual block, while only if at least one of the quantized frequency coefficients is not '0' and the A×B residual block pixel number is equal to or less than the predetermined number, it becomes allowable to incorporate the encoding identification information indicative of the A×B encoding, block shape information, and block positional information into the bitstream. Therefore, depending on the characteristics of the block, it is possible to reduce the amount of bits for the mode information containing the encoding identification information, block shape information, and block positional information.

In addition, since the fourth aspect restrictively performs the A×B encoding if the A×B residual block pixel number is equal to or less than the predetermined number, there are reduced number pixels in the A×B residual block to process which in turn reduces the number of bits of data encoded of the A×B residual block.

A video decoding apparatus according to a fourth aspect comprises all of the components of video decoding apparatus 1200 of the first aspect described with reference to FIG. 12. An exception is that when decoder 1210 obtains the quantized frequency coefficient sequence from the bitstream, it checks whether the number of the coefficients is equal to or less than a predetermined number, and if so, extracts mode information from the bitstream to confirm the encoding identification information as being the A×B encoding, whereby extracting the block shape information and block positional information. In other words, the fourth aspect differs from the first aspect in that the number of the coefficients in the sequence is first checked so as to effect the decoding by the A×B block only if the number of pixels of the A×B block is equal to or less than a predetermined number.

For example, the video decoding apparatus according to the fourth aspect checks the number of non-zero coefficients or total coefficient and the number of zero-coefficients or total zero of the quantized frequency coefficient sequence to figure out the number of the quantized frequency coefficients of the corresponding block, and if the number is more than the predetermined 'N', determines that the residual block underwent the M×N encoding (since the frequency number cannot exceed 'N' in the A×B encoding) but if 'N' is not exceeded, bearing in mind that M×N encoding may still generate the frequency coefficient number of 'N' and under (examples are a singular DC component frequency coefficient in existence and an occurrence of low frequency component of frequency coefficients near the DC component), additionally extracts mode information from the bitstream and checks the encoding identification information contained in the mode information to determine whether the A×B encoding is correct. If not, the bitstream does not include the mode information but the bitstream includes the mode information containing the encoding identification information, block shape information, and block positional information only when the A×B encoding is correct.

A video encoding apparatus according to a fifth aspect comprises all of the components of video encoding apparatus 1800 of the fourth aspect described with reference to FIG. 18 with a partial functional modification in coefficient identifier 1820. In the following description, the detailed explanation presented above with reference to FIG. 18 is held from a repetition.

The video encoding apparatus according to the fifth aspect is similar to video encoding apparatus 1800 of the fourth aspect in that it performs the A×B encoding on the A×B residual block, which includes the impulsive component residual signal. Exceptionally, it determines whether all of the frequency coefficient values of the quantized residual block through encoding the M×N residual block in the typical method are '0', and if so, performs the typical zig-zag scanning and encoding on the typically predicted, transformed, and quantized M×N residual block and thereby generating the bitstream, while if one or more coefficient values are not '0', performs the A×B encoding wherein the prediction, transform, and quantization are carried out by the A×B block and different scanning methods are applied by the A×B block shapes before encoding them. Additionally, the video encoding apparatus according to the fifth aspect in the A×B encoding determines in the case where at least one of the quantized frequency coefficients is not '0' whether the A×B residual block pixel number is more than the predetermined number, and if so, performs the A×B encoding, but otherwise it takes the conventional method of encoding the M×N residual block. For example, if the predetermined value is eight, the M×N encoding is performed on such a residual block with A times B being equal to or less than 8 while the A×B encoding is performed on a residual block, which is over 8. That is, on the residual blocks of such as 3×3, 3×4, 4×3, the A×B encoding is performed, since they are more than 8.

Coefficient identifier 1820 determines if the quantized frequency coefficients of the quantized residual block delivered from M×N quantizer 650 are commonly '0', and if so, relays the conventionally predicted, transformed, and quantized M×N residual block to scanner 660 while having the mode information containing the encoding identification information indicative of the M×N encoding incorporated into the bitstream and scanned in the typical zig-zag scanning, but if one or more quantized frequency coefficients are not '0', determines whether the pixel number of the A×B residual block is more than a predetermined number, and only if so, incorporates the mode information that contains the encoding identification information indicative of the A×B encoding, block shape information, and block positional information into the bitstream, and relays the quantized A×B residual block delivered from A×B quantizer 652 to scanner 660 for scanning the same in different methods changing by the A×B block shapes. If the pixel number of the A×B residual block is equal to or less than the predetermined number, the mode information that contains the encoding identification information indicative of the M×N encoding is incorporated into the bitstream and the conventionally predicted, transformed, and quantized M×N residual block is relayed to scanner 660 for performing the encoding operation.

Figure 20:
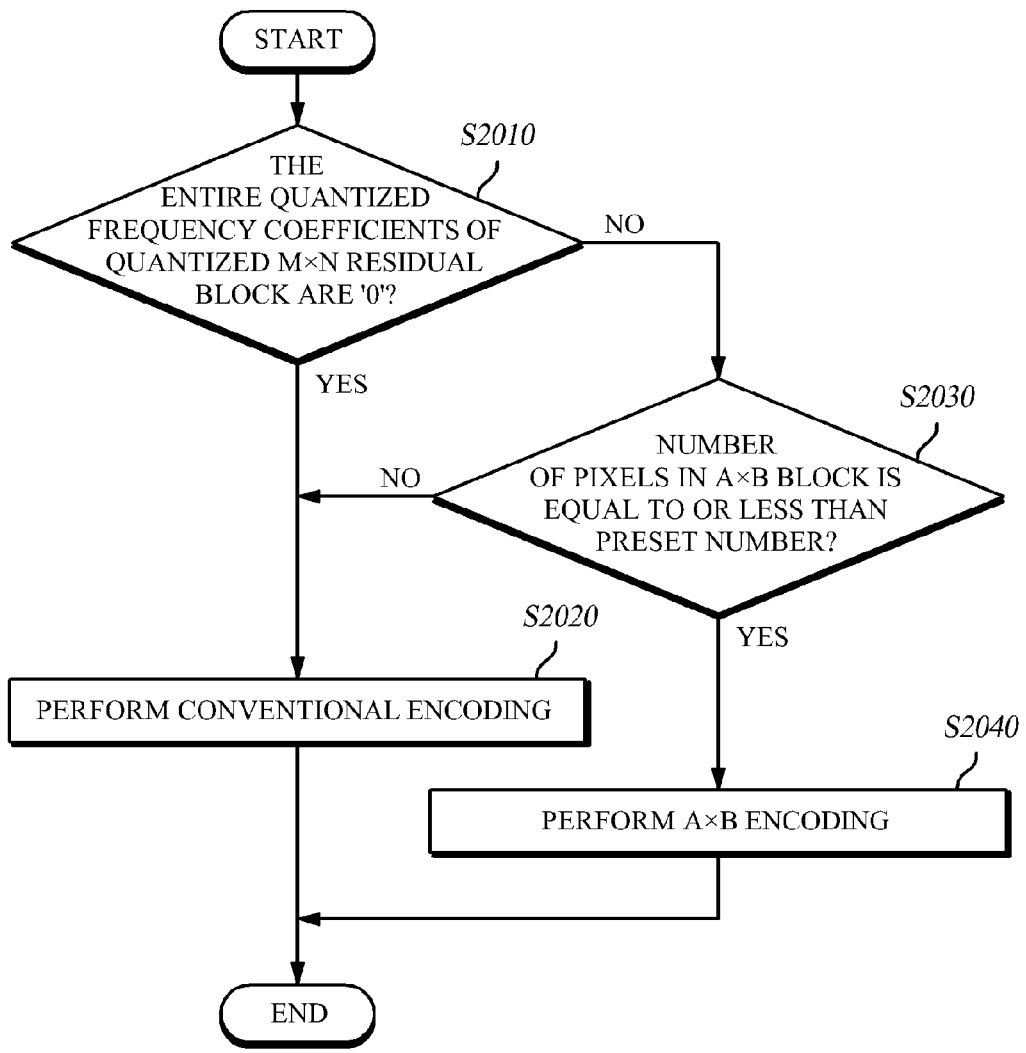
FIG. 20 a flow diagram for illustrating a video encoding method according to a fifth aspect.

FIG. 20 a flow diagram for illustrating a video encoding method according to a fifth aspect.

In step S2010, the video encoding apparatus according to the fifth aspect determines whether all of the quantized frequency coefficients of the M×N residual block quantized in the typical method of performing the encoding by the M×N block are '0'. If step S2010 totally determines '0', the video encoding apparatus performs the typical zig-zag scanning and encoding on the quantized frequency coefficients encoded by the M×N block to generate the bitstream in step S2020. If step S2010 determines that at least one of the quantized frequency coefficients are not '0', the video encoding apparatus checks whether the pixels of the A×B residual block are more than a predetermined number in step S2030. If the predetermined number is not exceeded in step S2030, the method proceeds to step S2020 to perform an encoding conventionally, but if is found exceeded, performs an A×B encoding where the A×B residual block is encoded by the A×B block to generate the bitstream.

According to the fifth aspect of the present disclosure as compared to the fourth aspect, although the A×B encoding only at the larger A×B residual block pixel number than the predetermined number may cause increased number of bits involved in encoding the A×B residual block due to more pixels of the A×B residual block and necessitates inclusions of encoding identification information for indicating the M×N or A×B encoding into the bitstream for the respective blocks, the bit amount required to encode the block shape information and block positional information of the A×B residual block can be rather reduced even further. For example, if the predetermined value is eight, since the A×B residual block may be configured by one of 3×3, 4×3, and 3×4, the determination of the A×B residual block shape may be within the smaller number of cases as is the determination of the A×B residual block position, a reduced number of bits will do for expressing the block shape information and block positional information.

A video decoding apparatus of a fifth aspect constructed equally to video decoding apparatus 1200 of the first aspect described referring to FIG. 12. Accordingly, a fifth aspect of the video decoding method equals to the first aspect of the video decoding method described referring to FIG. 13.

Here, different from the fourth aspect, the video decoding apparatus of the fifth aspect does not prejudge the number of the frequency coefficients even if the predetermined 'N' is exceeded by the number of the quantized frequency coefficients that is identified through the total coefficient and total zero of the frequency coefficient sequence because simply doing so is not enough to conclude that the residual block had the A×B encoding. Specifically, because performing the M×N encoding may still make the number of the quantized frequency coefficients is more than N, the same number cannot determine whether the residual block went through the A×B encoding or M×N encoding. For this reason, the video decoding apparatus of the fifth operates like the first aspect to read in encoding identification information inside mode information from the bitstream to judge between the M×N encoding and the A×B encoding, and if it was the A×B encoding, additionally reads in the block shape information and block positional information inside the mode information to perform the A×B decoding operation.

A selective combination of the above first to fifth aspects may implement a sixth aspect to follow. To encode videos, the video encoding apparatus according to the sixth aspect may include a predictor for generating a predicted block from predicting a current block, a subtractor for generating an M×N residual block by subtracting the predicted block from the current block, and an A×B encoder for encoding an A×B residual block including residual signals of an impulsive component in the M×N residual block to generate a bitstream. Here, the A×B encoder may generate mode information, which contains one or more of A×B residual block's block shape information, block positional information, and encoding mode information for identifying the A×B encoding, and then insert the mode information into the bitstream.

In addition, the video encoding apparatus according to the sixth aspect may include an M×N encoder for encoding the M×N residual block to generate the bitstream; and an encoding mode determiner for determining between the M×N residual block and the A×B residual block to encode depending on whether the residual signals of the impulsive component are included in the M×N residual block.

According to a method for video encoding of a sixth aspect, there is provided a video encoding apparatus that may perform generating a predicted block from predicting a current block and subtracting the predicted block from the current block to generate an M×N residual block, and encode an A×B residual block containing residual signals of an impulsive component in the M×N residual block to generate a bitstream. The video encoding apparatus may also perform generating mode information including one or more of block shape information of the A×B residual block, block positional information of the A×B residual block, and encoding identification information for identifying the A×B encoding and then inserting the mode information in the bitstream.

Additionally, the video encoding apparatus may perform encoding the M×N residual block to generate the bitstream if the A×B residual block is same in size as the M×N residual block, and setting entire residual signals of the M×N residual block to zero and then encoding the same residual signals if the M×N residual block does not include the residual signals of the impulsive component.

In the step of A×B encoding, the video encoding apparatus may operate by differently scanning quantized frequency coefficients generated through transformation and quantization of the A×B residual block, according to the shape of the A×B residual block, and perform the encoding of the A×B residual block only if the A×B residual block is smaller than the M×N residual block. Additionally, the A×B residual block may be shaped as a rectangular block or diagonal arrangement of blocks. The video encoding apparatus may additionally perform to generate one or more of diagonal block identification information and diagonal block positional information for insertion in the bitstream if the A×B residual block is shaped as the diagonal blocks.

In addition, the video encoding apparatus may perform the step of A×B residual block encoding only if the A×B residual block has an impulse rate that is higher than a threshold value. In addition, the video encoding apparatus may perform the step of A×B encoding only if the number of pixels in the A×B residual block is equal to or less than a predetermined number. Especially, the video encoding apparatus may perform the step of A×B residual block encoding only if one or more of quantized frequency coefficients generated through transformation and quantization of the M×N residual block are not zero and the number of pixels in the A×B residual block is equal to or less than a predetermined number. Incidentally, the video encoding apparatus may generate mode information including one or more of block shape information of the A×B residual block, block positional information of the A×B residual block, and encoding identification information for identifying the A×B encoding and then insert the mode information in the bitstream only if one or more of the quantized frequency coefficients generated through transformation and quantization of the M×N residual block are not zero and the number of the pixels in the A×B residual block is equal to or less than the predetermined number.

In addition, the video encoding apparatus may perform the step of A×B residual block encoding only if the number of pixels in the A×B residual block is more than a predetermined number. Particularly, the video encoding apparatus may perform the step of A×B residual block encoding only if one or more of quantized frequency coefficients generated through transformation and quantization of the M×N residual block are not zero and the number of pixels in the A×B residual block is more than the predetermined number. Incidentally, the video encoding apparatus may generate mode information including one or more of block shape information of the A×B residual block, block positional information of the A×B residual block, and encoding identification information for identifying the A×B encoding and then insert the mode information in the bitstream only if one or more of the quantized frequency coefficients generated through transformation and quantization of the M×N residual block are not zero and the number of the pixels in the A×B residual block is more than the predetermined number.

An apparatus for video decoding according to a sixth aspect may include a decoder for decoding a bitstream to extract quantized frequency coefficients in a sequence, an A×B residual block generator for generating an A×B residual block by performing an inverse scan, inverse quantization and inverse transform with respect to the quantized frequency coefficient sequence by the A×B block, an M×N residual block generator for generating an M×N residual block by adding one or more residual signals to the A×B residual block, a predictor for generating a predicted block from predicting a current block; and an adder for reconstructing the current block by adding the predicted block to the M×N residual block.

According to a method for video decoding of a sixth aspect, there is provided a video decoding apparatus that may perform decoding a bitstream to extract quantized frequency coefficients in a sequence, generating an A×B residual block by performing an inverse scan, inverse quantization and inverse transform with respect to the quantized frequency coefficient sequence by the A×B block, generating an M×N residual block by adding one or more residual signals to the A×B residual block, generating a predicted block from predicting a current block; and reconstructing the current block by adding the predicted block to the M×N residual block.

Herein, to generate the A×B residual block, the video decoding apparatus may perform the inverse scan, inverse quantization and inverse transform with respect to the sequence of quantized frequency coefficients by the A×B block based on block shape information of the A×B residual block included in mode information extracted from the bitstream. In addition, the video decoding apparatus may perform the step of generating the M×N residual block based on block positional information of the A×B residual block included in mode information extracted from the bitstream. Further, the one or more residual signals may have predetermined values, and in particular, they may be commonly set to zero. Still further, the video decoding apparatus may perform the step of generating the M×N residual block by using a replacement residual signal identified by replacement residual signal information extracted from the bitstream for the one or more residual signals.

Additionally, in the step of generating the A×B residual block, the video decoding apparatus may extract mode information from the bitstream and perform to generate the A×B residual block only if an A×B encoding is identified by encoding identification information included in mode information extracted from the bitstream. In addition, the video decoding apparatus may perform the step of generating the A×B residual block only if the number of the quantized frequency coefficients in the sequence is equal to or less than a predetermined number.

An apparatus for video decoding may include a decoder for decoding a bitstream to extract quantized frequency coefficients in a sequence, an A×B residual block generator for generating an A×B residual block by performing an inverse scan, inverse quantization and inverse transform with respect to the quantized frequency coefficient sequence by the A×B block, an M×N residual block generator for generating an M×N residual block by adding one or more residual signals to the A×B residual block, a predictor for generating a predicted block from predicting a current block, and an adder for reconstructing the current block by adding the predicted block to the M×N residual block.

In the description above, although all of the components of the aspect of the present disclosure may have been explained as assembled or operatively connected as a unit, the present disclosure is not intended to limit itself to such aspect. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

According to the disclosure as described above, when applied to the video encoding/decoding apparatus and method, the present disclosure handles residual signals of impulsive component originated from incorrect predictions and the like by correspondingly changing the methods of encoding and decoding the video in a more effective manner and practically improves the video coding efficiency.

The invention claimed is:

1. A method for video encoding, the method comprising:
   generating a predicted block by predicting a current block;
   generating an M×N residual block by subtracting the predicted block from the current block; when the M×N residual block includes no impulsive components having values larger than the predetermined value, setting all residual signals of the M×N residual block to zero; and
   when one or more of frequency coefficients generated through transformation and quantization of the M×N residual block are not zero, and
   when the M×N residual block contains one or more impulsive components having values larger than a predetermined value, performing sub-steps of:
      selecting an A×B residual block containing the impulsive components and then transforming the A×B residual block into frequency coefficients, wherein wherein the A×B residual block is selected such that the A×B residual block is smaller in size than the entire M×N residual block; and the number of pixels in the A×B residual block is more than a predetermined number,
      encoding the frequency coefficients of the A×B residual block into a bitstream, and
      encoding information on a position and a size of the A×B residual block into the bitstream,
      wherein residual signals in the M×N residual block, which are excluded from the A×B residual block, are not encoded into the bitstream.

2. The method of claim 1, wherein the performing the sub-steps further comprises:
   encoding, into the bitstream, identification information indicating that not the M×N residual block but the A×B residual block is encoded.

3. The method of claim 1, wherein the encoding the frequency coefficients of the A×B residual block further comprises differently scanning frequency coefficients generated through transformation and quantization of the A×B residual block, according to the shape of the A×B residual block.

4. The method of claim 1, wherein the A×B residual block is shaped as a rectangular block or a diagonal arrangement of blocks.

5. The method of claim 4, wherein the performing the sub-steps further comprises:
   encoding diagonal block identification information into the bitstream when the A×B residual block is shaped as the diagonal arrangement of blocks.

6. The method of claim 1, wherein the A×B residual block is selected to have an impulse rate that is higher than a threshold value.

7. The method of claim 1, wherein the performing the sub-steps further comprises:
encoding, into the bitstream, identification information indicating the encoding of the A×B residual block.

8. The method of claim 1, wherein the performing the sub-steps further comprises:
inserting replacement residual signal information into the bitstream, wherein the replacement residual signal information identifies a replacement residual value for all residual signals of the M×N residual block that are not in the A×B residual block.

9. An apparatus for video encoding, the apparatus comprising:
a predictor configured to generate a predicted block which is predicted from a current block;
a subtractor configured to generate an M×N residual block by subtracting the predicted block from the current block; an encoding mode determiner configured to set all residual signals of the M×N residual block to zero, when the M×N residual block includes no impulsive components having values larger than the predetermined value; and
an A×B encoder configured to, in response to the M×N residual block containing one or more impulsive components having values larger than a predetermined value, when one or more of frequency coefficients generated through transformation and quantization of the M×N residual block are not zero,
select an A×B residual block containing the impulsive components and then transform the A×B residual block into frequency coefficients, wherein the A×B residual block is selected such that the A×B residual block is smaller in size than the entire M×N residual block and the number of pixels in the A×B residual block is more than a predetermined number;
encode the frequency coefficients of the an A×B residual block into a bitstream, and
encode information on a position and a size of the A×B residual block into the bitstream,
wherein residual signals in the M×N residual block, which are excluded from the A×B residual block, are not encoded into the bitstream.

10. The apparatus of claim 9, further comprising:
an M×N encoder configured to encode the M×N residual block to generate the bitstream,
an wherein the encoding mode determiner is further configured to determine between the M×N encoder and the A×B encoder to encode, depending on whether the residual signals which include the one or more impulsive components are included in the M×N residual block.

11. The apparatus of claim 9, wherein the A×B encoder is further configured to
encode, into the bitstream, identification information indicating that not the M×N residual block but the A×B residual block is encoded.

12. A method for video decoding, the method comprising:
identifying, from a bitstream, whether all quantized frequency coefficients of an M×N residual block are zero; when all quantized frequency coefficients of the M×N residual block are zero, setting all residual signals of the M×N residual block to zero; when one or more of quantized frequency coefficients of the M×N residual block are not zero, performing sub-steps of:
decoding the bitstream to extract information on a position and a size of an A×B residual block which is a part of the M×N residual block wherein the number of pixels in the A×B residual block is more than a predetermined number,
decoding the bitstream to extract frequency coefficients of the A×B residual block according to the extracted information,
generating the A×B residual block by using the frequency coefficients of the A×B residual block, and;
generating the M×N residual block by
inserting the A×B residual block into a corresponding position in the M×N residual block, based on the extracted information, and
adding one or more residual signals into remaining positions in the M×N residual block but outside the A×B residual block;
generating a predicted block by predicting a current block; and
reconstructing the current block by adding the predicted block to the generated M×N residual block,
wherein the one or more residual signals are set to a predetermined value or a replacement residual value extracted from the bitstream.

13. The method of claim 12, wherein the predetermined value is zero.

14. An apparatus for video decoding, the apparatus comprising:
a decoder configured to identify, from a bitstream, whether all quantized frequency coefficients of an M×N residual block are zero, and
when one or more of quantized frequency coefficients of the M×N residual block are not zero, decode the bitstream to extract information on a position and a size of the A×B residual block which is a part of the M×N residual block and extract frequency coefficients of the A×B residual block according to the extracted information, wherein the number of pixels in the A×B residual block is more than a predetermined number;
an A×B residual block generator configured to generate the A×B residual block by using the frequency coefficients of the A×B residual block;
an M×N residual block generator configured to when all quantized frequency coefficients of the M×N residual block are zero, setting all residual signals of the M×N residual block to zero, and when one or more of quantized frequency coefficients of the M×N residual block are not zero, generate the M×N residual block by
inserting the A×B residual block into a corresponding position in the M×N residual block based on the extracted information, and
adding one or more residual signals into remaining positions in the M×N residual block but outside the A×B residual block;
a predictor configured to generate a predicted block by predicting from a current block; and
an adder configured to reconstruct the current block by adding the predicted block to the generated M×N residual block,
wherein the one or more residual signals are set to a predetermined value or a replacement residual value extracted from the bitstream.

* * * * *